United States Patent
Jones et al.

(10) Patent No.: US 7,801,033 B2
(45) Date of Patent: *Sep. 21, 2010

(54) SYSTEM OF VIRTUAL DATA CHANNELS IN AN INTEGRATED CIRCUIT

(75) Inventors: Anthony Mark Jones, Beaverton, OR (US); Paul M. Wasson, Beaverton, OR (US); Michael R. Butts, Beaverton, OR (US)

(73) Assignee: Nethra Imaging, Inc., Santa Clara, CA (US)

( * ) Notice: Subject to any disclaimer, the term of this patent is extended or adjusted under 35 U.S.C. 154(b) by 1053 days.

This patent is subject to a terminal disclaimer.

(21) Appl. No.: 11/340,957

(22) Filed: Jan. 27, 2006

(65) Prior Publication Data

US 2007/0025382 A1    Feb. 1, 2007

Related U.S. Application Data

(60) Provisional application No. 60/734,623, filed on Nov. 7, 2005, provisional application No. 60/702,727, filed on Jul. 26, 2005.

(51) Int. Cl.
*H04L 12/64* (2006.01)
*H04L 12/28* (2006.01)
*H04L 12/403* (2006.01)

(52) U.S. Cl. .................. 370/230; 370/235; 370/419; 370/450

(58) Field of Classification Search .......... 370/431, 370/464–467, 469, 329, 341, 437–440
See application file for complete search history.

(56) References Cited

U.S. PATENT DOCUMENTS

| | | | |
|---|---|---|---|
| 4,523,310 A | 6/1985 | Brown et al. | |
| 4,953,081 A | 8/1990 | Feal et al. | |
| 5,093,827 A | 3/1992 | Franklin et al. | |
| 5,319,771 A | 6/1994 | Takeda | |
| 5,345,109 A | 9/1994 | Mehta | |
| 5,347,637 A * | 9/1994 | Halford | 710/316 |
| 5,577,213 A * | 11/1996 | Avery et al. | 710/100 |
| 5,634,117 A | 5/1997 | Conary et al. | |
| 5,799,208 A | 8/1998 | Hwang et al. | |

(Continued)

FOREIGN PATENT DOCUMENTS

EP    0 547 768 A2    6/1993

(Continued)

OTHER PUBLICATIONS

European Search Report dated Jan. 9, 2009, from related European Application No. EP06839752.

*Primary Examiner*—Tri H Phan
(74) *Attorney, Agent, or Firm*—Marger Johnson & McCollom, P.C.

(57) ABSTRACT

This disclosure relates to a system of communicating, data within an integrated circuit. Multiple components, or channels, can share common physical communication lines between elements within the system. In some aspect, only one component can access the physical lines at a given time and a selection device chooses which component is active on the physical lines and makes the appropriate connection to the lines. The selection and connection can be completed without requiring or reporting information to the components, and is thus transparent.

35 Claims, 17 Drawing Sheets

U.S. PATENT DOCUMENTS

| | | | |
|---|---|---|---|
| 5,809,021 A * | 9/1998 | Diaz et al. | 370/364 |
| 6,173,189 B1 | 1/2001 | Lockhart | |
| 6,345,328 B1 | 2/2002 | Rozario et al. | |
| 6,366,583 B2 * | 4/2002 | Rowett et al. | 370/401 |
| 6,400,291 B1 | 6/2002 | Sankey | |
| 6,636,922 B1 | 10/2003 | Bastiani et al. | |
| 6,775,706 B1 * | 8/2004 | Fukumoto et al. | 709/230 |
| 6,798,744 B1 * | 9/2004 | Loewen et al. | 370/235 |
| 6,963,535 B2 * | 11/2005 | Stark et al. | 370/230 |
| 7,032,045 B2 | 4/2006 | Kostadinov | |
| 7,272,677 B1 | 9/2007 | Venkata et al. | |
| 7,346,078 B2 * | 3/2008 | Gulati et al. | 370/469 |
| 7,366,190 B2 * | 4/2008 | Black et al. | 370/406 |
| 7,403,525 B2 * | 7/2008 | Sano et al. | 370/392 |
| 2002/0069375 A1 | 6/2002 | Bowen | |
| 2002/0126693 A1 | 9/2002 | Stark et al. | |
| 2004/0130346 A1 | 7/2004 | Atkinson et al. | |
| 2005/0034009 A1 | 2/2005 | Sutardja et al. | |
| 2005/0044324 A1 * | 2/2005 | Rashid et al. | 711/122 |
| 2005/0246477 A1 | 11/2005 | Adams et al. | |
| 2007/0038782 A1 * | 2/2007 | Jones | 709/250 |

FOREIGN PATENT DOCUMENTS

| | | |
|---|---|---|
| EP | 0685799 A1 | 12/1995 |

* cited by examiner

SYSTEM OF VIRTUAL DATA CHANNELS IN AN INTEGRATED CIRCUIT

CROSS REFERENCE TO RELATED APPLICATIONS

This disclosure claims priority from U.S. Provisional Application 60/734,623, entitled TESSELLATED MULTI-ELEMENT PROCESSOR AND HIERARCHICAL COMMUNICATION NETWORK, filed Nov. 7, 2005, and from U.S. Provisional Application 60/702,727, filed Jul. 26, 2005, entitled SYSTEM FOR GENERATING MULTIPLE CLOCK FREQUENCIES FOR MULTIPLE CLOCK DOMAINS AND FOR SHARING DATA ACROSS THOSE DOMAINS, both assigned to the assignee of the present invention and both incorporated by reference herein.

TECHNICAL FIELD

This disclosure relates to transferring data within an integrated circuit, and, more particularly, to a system that increases the amount of data that can be transferred over a network of data communication paths within an integrated circuit.

BACKGROUND

Efficient communication between components of an integrated circuit is always challenging, especially within integrated circuits that include a large number of communicating elements. A rich communication fabric is essential for modern data-centric digital circuits, but each physical wire that carries data consumes valuable area and power resources in the circuit. A communication fabric that is too rich for the activities that its attached components are performing is wasted by the communication fabric sitting idle for long periods of time, while a communication fabric that is too lean creates idle components waiting for data bottlenecks to clear in the communication fabric. Serializing data to reduce the number of transmission wires is one alternative to minimize power and area of a communication network, but that comes at an increased transmission latency. Further, such serial communication, to be most effective, should operate at a higher frequency than the elements that create the parallel data, otherwise the operation of the entire system slows. Integrated circuits that operate at frequency sufficiently high enough that serial communication can occur without performance penalty, i.e., integrated circuits that include communication portions that operate many multiples faster than data generation portions, can be difficult to provide. Not many modern integrated circuits have such high-frequency resources available to them.

FIG. 1 illustrates example communication systems within an integrated circuit 15 in the prior art. Of course, typical integrated circuits may contain thousands or hundreds of thousands of communication channels, and those illustrated in FIG. 1 are simple instructional examples.

Communication paths can be uni-directional or bi-directional. Bi-directional communication sends data either way between two communication nodes. Uni-directional communication paths send data from a sender to a receiver. An example of uni-directional communications is described in U.S. Pat. No. 6,816,562. Even in "uni-directional" paths, some data, such as protocol data or information may travel backwards from the receiver to the sender—such as sending an "acknowledge" signal after the receiver has received the data. As used in this disclosure, the term "unidirectional" communication is generally used when desired data is sent only from a sender to a receiver, without regard to protocol information, which may travel in any direction. Variants of the invention are equally applicable to both uni-directional and bi-directional communication.

Referring back to FIG. 1, in the most simple case, a data sending node, sending node, or sender 20 sends data to a data receiving node, receiving node, or receiver 22 over a communication channel 24. In most instances within an integrated circuit the communication channel 24 is a metal trace that carries electrical signals, but other communication methods are known in the art. After the data is received, the receiver 22 may acknowledge that it has received the data. In a bi-directional scheme, data could be sent in either direction over the data channel 24.

In the next example, a sender 30 sends data to a receiver 32. In this example, there are four data channels 34 that operate in parallel. Thus, in one data communication cycle four pieces of data can be transferred between the sender 30 and the receiver 32. Also included in the data channels 34 is a set of data storage nodes 36, one for each channel 34. The storage nodes 36 may be designed and configured to store more than one piece of data. For example, each storage node 36 may be configured to store ten pieces of data. An example of such a storage node 36 is a FIFO (First In First Out) storage, also known as a queue. FIFOs are useful in data communication because they store data in the order received until the data is ready to be used. FIFOs are especially useful in systems where the sender 30 and receiver 32 are not synchronized—i.e., in those systems where the sender 30 does not know if the receiver 32 is in a state ready to accept data. By instead loading data from the sender 30 into a FIFO, the receiver 32 can access the data whenever it is ready.

In the next example, a sender 40 sends data to a receiver 42. In this example, the sender 40 outputs eight bits of parallel data that are 'serialized' into, for example, one or two communication channels 46 by a serializer 44. At the destination, a de-serializer 48 converts the serialized data back into eight bits of parallel data for use by the receiver 42. By using a serializing system, fewer communication channels are used than the number of parallel bits output by the sender 40, which can be a benefit in systems that may have long or many communication channels. Routing one or two wires between the sender 40 and the receiver 42 uses less resources than routing eight parallel wires. There is an extra cost, however, in that both a serializer 44 and a de-serializer 48 are added to the system cost, for each communication path that uses such a system. Additionally, unless the serializer runs at a higher clock speed than the sender 40 and receiver 42, the overall data transmission speed of the data between the sender 40 and receiver 42 is reduced, because it takes at least four or eight times as long, depending on whether there are one or two serial communication channels 46, to send the data to the receiver 42. There is further delay with converting the parallel data to serial data at the sender 40 side, then re-converting the data back to parallel at the receiver side 42, although some of these actions may be performed in parallel. Even more delay may be caused by communication protocol overhead, such as by sending a signal informing the receiver that there is data ready to be sent, and sending an acknowledgement after the data has been received. Such serial systems are common in the prior art, even given their deficiencies, due to the space savings of not having to run parallel communication paths throughout the integrated circuit.

A difficulty lies in striking a balance between a communication system that is too richly connected and one that uses minimal resources while simultaneously being easy to integrate into the communication system.

Embodiments of the invention address these and other limitations in the prior art.

DETAILED DESCRIPTION

In embodiments of the invention, "Virtual" channels allow multiple components to share physical communication lines between elements within the system. Even if only one set of physical communication lines is established between two elements, one or more sets of data storage elements can be connected to the physical communication lines, thereby allowing virtual data "channels" to be created, each able to use a time-slice of the physical communication lines. Using virtual channels helps maximize the use of physical resources and prevents communication stalls that could affect other types of point to point communication systems.

Figure 2:
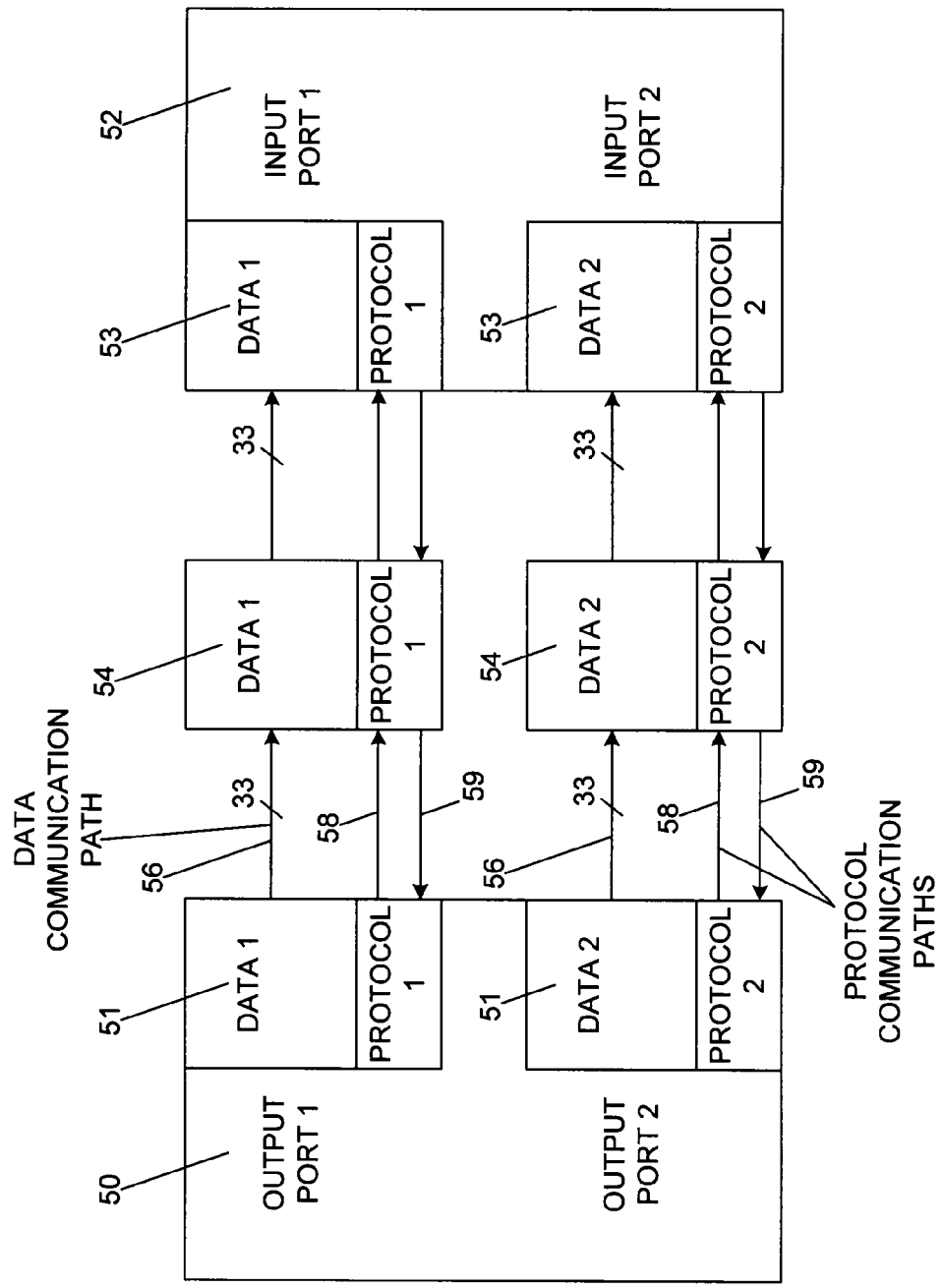
FIG. 2 is a block diagram of a communication system including data lines and a set of protocol lines according to embodiments of the invention.

FIG. 2 is a block diagram illustrating ports and storage elements in a communication system according to embodiments of the invention. A sender 50 includes two output ports, 51, each of which includes storage elements, such as registers or latches, although any method of storing data could work. The storage elements store data and protocol signals for managing the data transfer. The protocol signals may also be referred to as protocol data. In one embodiment, there are 33 data storage elements and two protocol storage elements in each output port 51. A receiver 52 includes two input ports 53, which store data and protocol information in the receiver 52. The input and output ports can be implemented as described in U.S. patent application Ser. No. 10/871,347, entitled Data Interface for Hardware Objects, assigned to the assignee of the present invention and incorporated by reference herein. As outlined in that application, these data interfaces typically operate in a clocked, synchronous system. Data messages that travel throughout a system using the data interfaces are asynchronous, however, in the sense that they may be generated at any particular time and not according to any particular schedule. Once generated, the messages can be sent across a clocked communication channel and delivered to a clocked receiver on a clock schedule, although the receiver itself, and not another outside process, controls when such messages are delivered.

Data passes between the sender 50 and receiver 52 along a data communication path 56. Protocol information passes between the sender 50 and receiver 52 along protocol communication paths 58 and 59. For instance, the communication path 58 may transmit data that indicates the accompanying data is valid, and the communication path 59 may transmit data that indicates that a successive stage is ready to accept data. These protocols and their operation are discussed in detail in the patent application referenced above. Although this disclosure will generally refer to protocol information traveling in two directions simultaneously, forward (with the data) and reverse (opposite the data), it is understood that the protocol information may actually be traveling in a single direction without affecting the spirit of the invention.

Along the communication paths 56, 58, and 59 of FIG. 2 are optional storage stages 54. Each storage stage 54 is structured to temporarily store the data and protocol information between the sender 50 and receiver 52. Storage stages 54 can be placed anywhere along the communication path 56, 58, 59 between the sender 50 and receiver 52. Although not strictly necessary, storage stages 54 can be used to minimize the spanning distance of communication lines between a sender 50 and a receiver 52. In such a case, the storage stage 54 becomes both a receiver and a sender, by receiving data and protocol information from the sender 50, and providing it to the receiver 52, or in the case of the communication path 59, by receiving protocol information from the receiver 52 and providing it to the sender 50.

In operation, data is loaded into one or both output ports 51 of the sender 50. When protocol information from one of communication paths 59 indicates that the successive stage is accepting data, the associated output port 51 sends data and protocol information along communication paths 56 and 58, in parallel, to the storage stage 54. As described above, the storage stage 54 is not strictly necessary, and in such a case where the storage stage is not present, the data and protocol data is sent directly from each of the output ports 51 to the respective input ports 53 of the receiver 52. It is noted that the "accepting" data, which is part of the communication protocol, travels on communication path 59 in "reverse," that is, in the opposite direction of the data on the communication path 56 and the protocol data on communication path 58. The accept signal that travels via communication path 59 is used to determine when data on communication path 54 may be transmitted. Therefore, when the local accept signal sent via the communication path 59 is asserted, data and protocol information may be transmitted to the next successive stage, provided such data is valid. When the local accept signal sent via the communication path 59 is de-asserted, the data and protocol information remains in its present location, such as the output port 51 or storage stage 54, and is not transferred to the successive stage. Although typically an asserted state is represented by a logical '1' or HIGH signal and a de-asserted state is represented by a logical '0' or LOW signal, such representations are implementation specific. The foregoing protocol is preferably used in the various embodiments described below.

Figure 3:
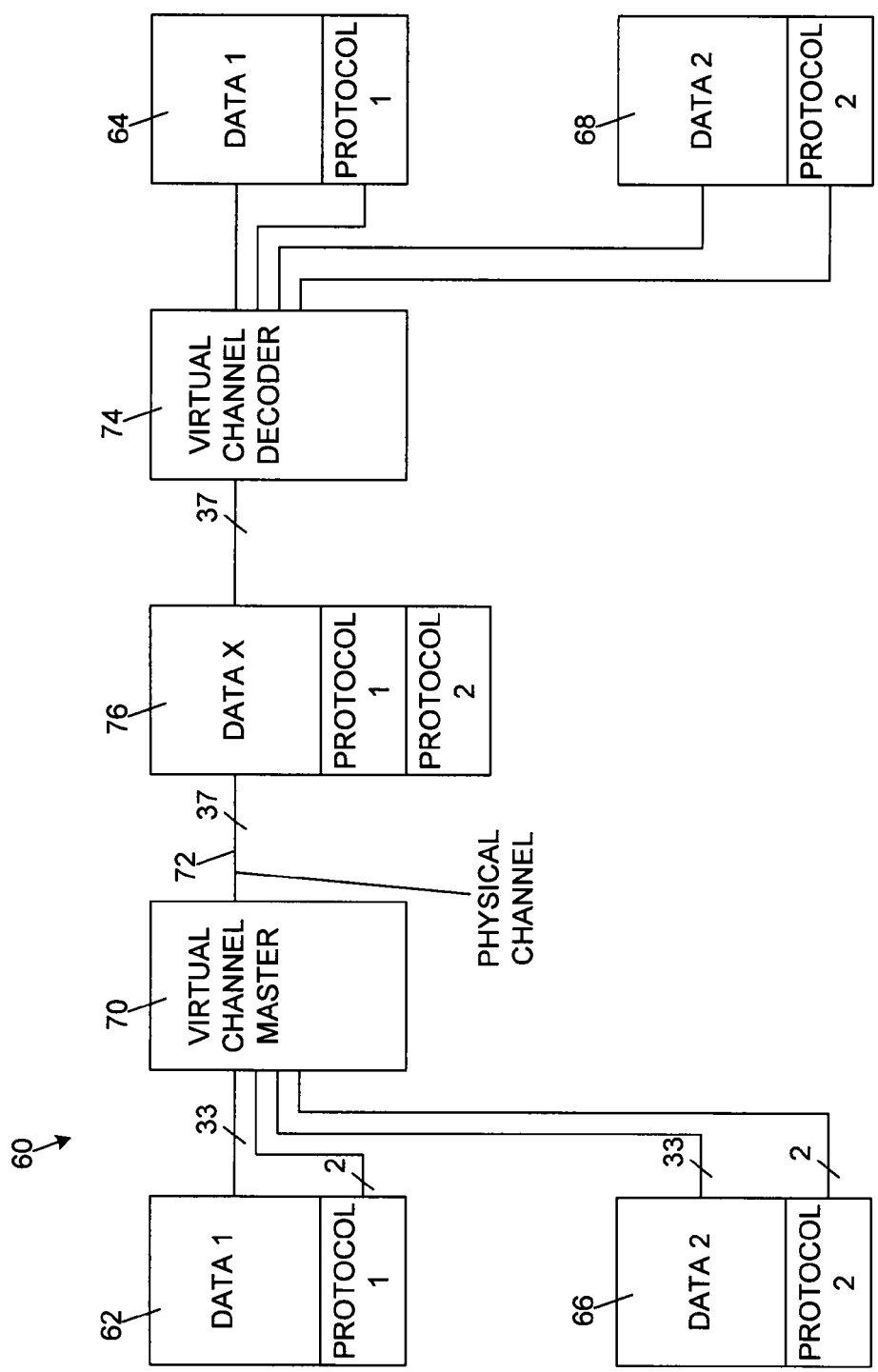
FIG. 3 is a block diagram of a communication system including virtual channels according to embodiments of the invention.

FIG. 3 is a block diagram illustrating an example system 60 of "virtual" communication channels according to embodiments of the invention. The communication channels are 'virtual' because, as will be described below, there is more than one communication channel for each physical channel, also referred to as a set of physical communication lines or a physical bus.

In FIG. 3, the system 60 includes two data sending registers, 62, 66 and two receiving registers 64, 68. Although these devices are referred to as "registers," they may be formed of any storage type element without changing the nature of their operation and embodiments of the invention are not limited to using any particular type of hardware structure. Also, although shown as distinct elements, the sending registers 62, 66 may be part of a single element, such as two output ports on a single processor.

In general, the data sending registers 62, 66 send their data to a virtual channel master 70. The virtual channel master selects one of the channels and places the data from the selected register on the physical channel 72, while the non-selected data register waits. In one embodiment, causing the non-selected channel to wait means that the virtual channel master 70 causes the "accept" line in the protocol buffer of the non-selected sending register to be de-asserted. The channel master 70 also de-asserts the valid bit of the protocol information of all of the non-selected channels. In other words, when the channel master 70 selects a virtual channel to be active, it sets the protocol information indicating validity of the data, also referred to as a "valid" bit, of the selected channel to 1, and sets all the valid bits of the non-selected channels to 0.

The output of the channel master 70 is then sent on the physical channel 72 to its destination. In one embodiment, as illustrated in FIG. 3, the physical channel 72 includes a number of separate communication lines that equals the amount of data stored in the sending register 62 plus the amount of protocol data stored in the other registers that are coupled to the virtual channel master 70. For instance, in FIG. 3, each of the data paths from the sending registers 62, 66 is 33 bits wide, and the protocol paths are each two bits wide. There are two sending registers 62, 66 connected to the channel master 70, and thus FIG. 3 illustrates a two-virtual-channel system 60. The physical channel 72 is therefore 37 lines wide, also referred to as 37 bits wide. Of the 37 communication lines, 33 communication lines carry the data from the selected channel, and four more lines carry the protocol data for both of the sending registers 62, 66. Other embodiments may include a different number of lines on the physical channel 72. For example, some of the protocol information may be encoded to minimize the number of lines needed for the physical channel 72. Other examples are discussed below. Also, if the sending registers 62, 66 were constructed of more or fewer protocol registers than illustrated, the size of the physical channel could be designed to match. Although not required, selecting the number of lines in the physical channel 72 to be equal to the number of data bits in a single one of the sending registers 62, 66 plus the number of protocol bits in all of the attached sending registers makes for very efficient data transfer, as illustrated below.

The data on the physical channel 72 is sent to a virtual channel decoder 74 that separates the data for the set of receiving registers 64, 68. In some embodiments, like the one illustrated in FIG. 3, the physical channel 72 may include one or more channel storage stages 76, which function to temporarily store data of the physical channel as described with reference to FIG. 2 above. The storage stage 76 differs from the storage stage 54 in FIG. 2 in that the storage stage 76 includes storage for more than one set of protocol information. Specifically, the storage stage 76 can store protocol information for all of the separate virtual channels attached to the virtual channel master 70. Additionally, the storage stage 76 is not limited to housing a single set of parallel registers, which would have a depth of '1,' but may include multiple sets of registers or could be formed by a FIFO (First In First Out) buffer for a greater storage depth. Of course, in those embodiments where data moves through one register stage per clock, having a greater storage depth increases the latency time between when data leaves the channel master 70 and when it reaches the channel decoder 74.

In operation, the virtual channel master 70 selects one of the sending registers 62, 66, i.e., one of the virtual channels, to be active on the physical channel 72. It does this by first inspecting the state of the protocol data in each protocol register. In one embodiment, the virtual channel master 70 evaluates the forward protocol from the sending register and the reverse protocol from the stage most directly connected to the channel master in the direction opposite from the sending register. For instance, in the system 60 illustrated in FIG. 3, the channel master 70 inspects the forward protocol from the sending registers 62, 66 and the reverse protocol from the storage stage 76. If the storage stage 76 were not present, the channel master 70 inspects the reverse protocol from the receiving registers 64, 68.

If the protocol data indicates that the data is valid (valid: asserted) and the successive stage is ready for data transfer (accept: asserted), then the associated sending register 62, 66 is ready to send data. If either the valid or accept protocol data is de-asserted, then the associated sending register 62, 66 is not ready to send data. Of course, if the sending register 62, 66 is not ready to send data, then the channel master 70 would not select it to be active on the physical channel 72. Once the channel master determines how many of the sending registers 62, 66 are ready to send data, the virtual master 70 then determines which of them will be selected. Any method of arbitration could be used to select the active register from the pool of registers ready to send data, such as round-robin, most-recently-used, or least-recently-used, or others, as are known in the art.

Once selected, the channel master 70 couples the data from the one selected sending register 62 or 66, plus forward protocol data for all of the registers 62, 66 to the physical channel 72, where it propagates forward to the virtual channel decoder 74. If one or more storage stages 76 are present, the data would be temporarily stored in the storage stage 76 as it moves across the physical channel 72 to the decoder 74. Once the data arrives at the virtual channel decoder 74, the decoder places the data just transferred into the appropriate receiving register 64, 68 that is associated with the sending registers 62, 66. Additionally, the decoder 74 routes the protocol information for both receiving registers 64, 68 into the appropriate register. The "accept" protocol information travels in the reverse direction, as described above.

Because of the parallel nature of the system 60 operation, one of the sending registers (62 or 66), the storage stage 76, and one of the receiving registers (64 or 68) can propagate data at every clock cycle. Thus, the system 60 can have a very high data throughput from the sending registers 62, 66 to the receiving registers 64, 68.

In one embodiment, the virtual channel master 70 controls the forward protocol information of the sending registers 62, 66, and the reverse protocol information from the storage stage 76. Because, for each data transmission cycle only one virtual channel can be selected, the virtual channel master 70 manipulates the forward protocol information for all of the non-selected channels to indicate that the non-selected channels are not valid. Similarly, the virtual channel master 70 manipulates the reverse protocol information for all of the non-selected channels to indicate that the successive registers of the non-selected channels are not accepting data input. This is known as "one-hot," in that regardless of how many sending registers 62, 66 are ready to send data and how many receiving registers 64, 68 are ready to receive data, the virtual channel master 70 signals only the selected data sending register as valid (by de-asserting all other forward protocol values), and signals only the selected data receiver as receiving by de-asserting all the non-selected receiving registers. Such protocol manipulation ensures that data will stay in its correct sending register 62, 66, until it is ready to be sent. It also ensures that only valid data is transmitted to the receiving registers 64, 68.

Figure 4A:
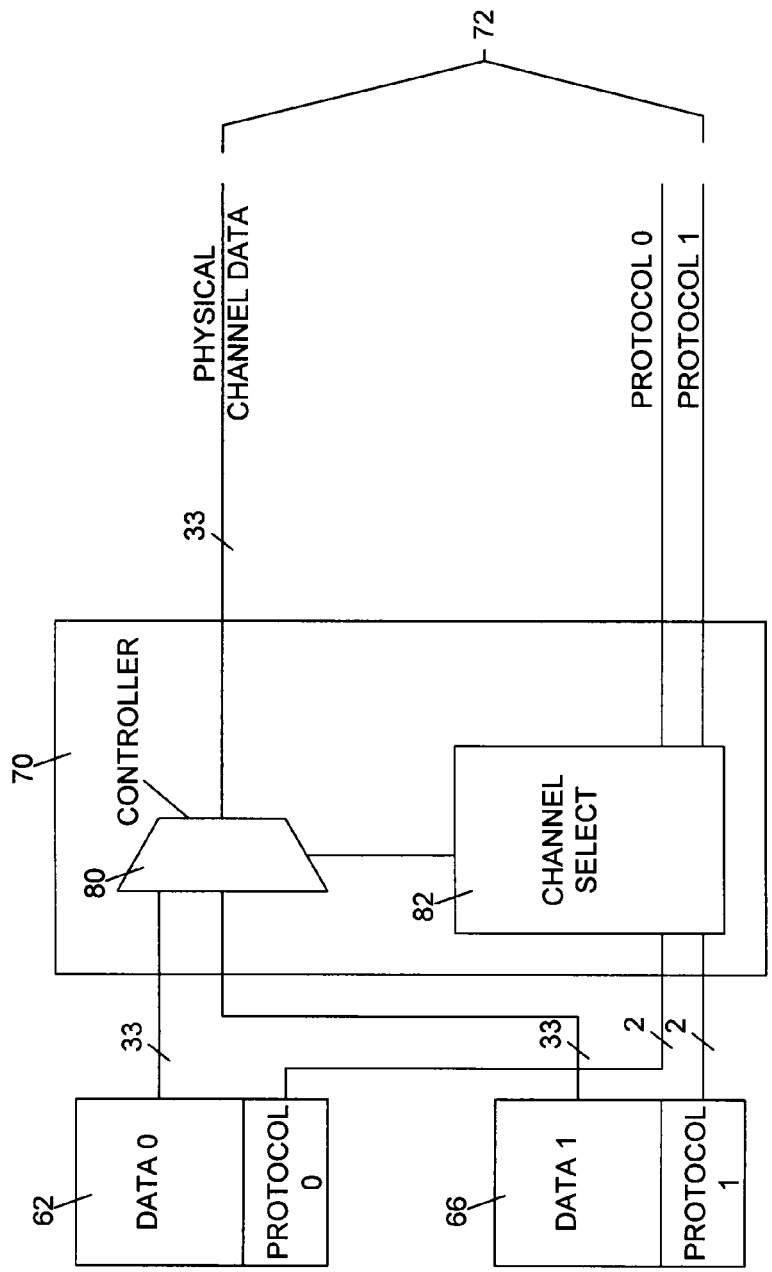
FIGS. 4A and 4B are block diagrams showing additional detail of the virtual channel system illustrated in FIG. 3.

FIG. 4A is a schematic diagram illustrating an example embodiment and environment of the virtual channel master 70 of FIG. 3. In operation, the channel master 70 uses protocol information from the virtual channels 0 and 1, among other information, such as a previous or current state, to determine which virtual channel to select as the next active on the physical channel 72. Once selected, the channel master 70 couples the appropriate data path from the selected sending register 62, 66 to the physical channel 72, as well as controls protocol information into and from virtual channels 0 and 1.

Inputs to the channel master 70 include data from the virtual channel 0 from sending register 62 and data from the virtual channel 1 from sending register 66. As described above, the data typically includes parallel data, which can be referred to as a word, and in this example, includes 33 bits of information. In the 33 bit example of FIG. 4A, one of the data bits, referred as the $33^{rd}$ bit, can signify membership in a message packet, or group of data, as described in the above-incorporated patent application. Alternatively, the packet membership identifier could be viewed as a bit of protocol information, and not as a separate data bit. In other embodiments, the width of the data word can be any size.

Data lines from the registers 62, 66 are coupled to a controller 80, which could be for example a multiplexer, having as many sets of inputs as there are virtual channels in the system. The controller 80 also includes one set of output data, which is the data component of the physical channel 72. A channel select device 82, which operates effectively as a small state machine, determines which set of data i.e., which virtual channel, is placed on the physical channel 72, and then sends an appropriate signal to the controller 80.

Figure 5:
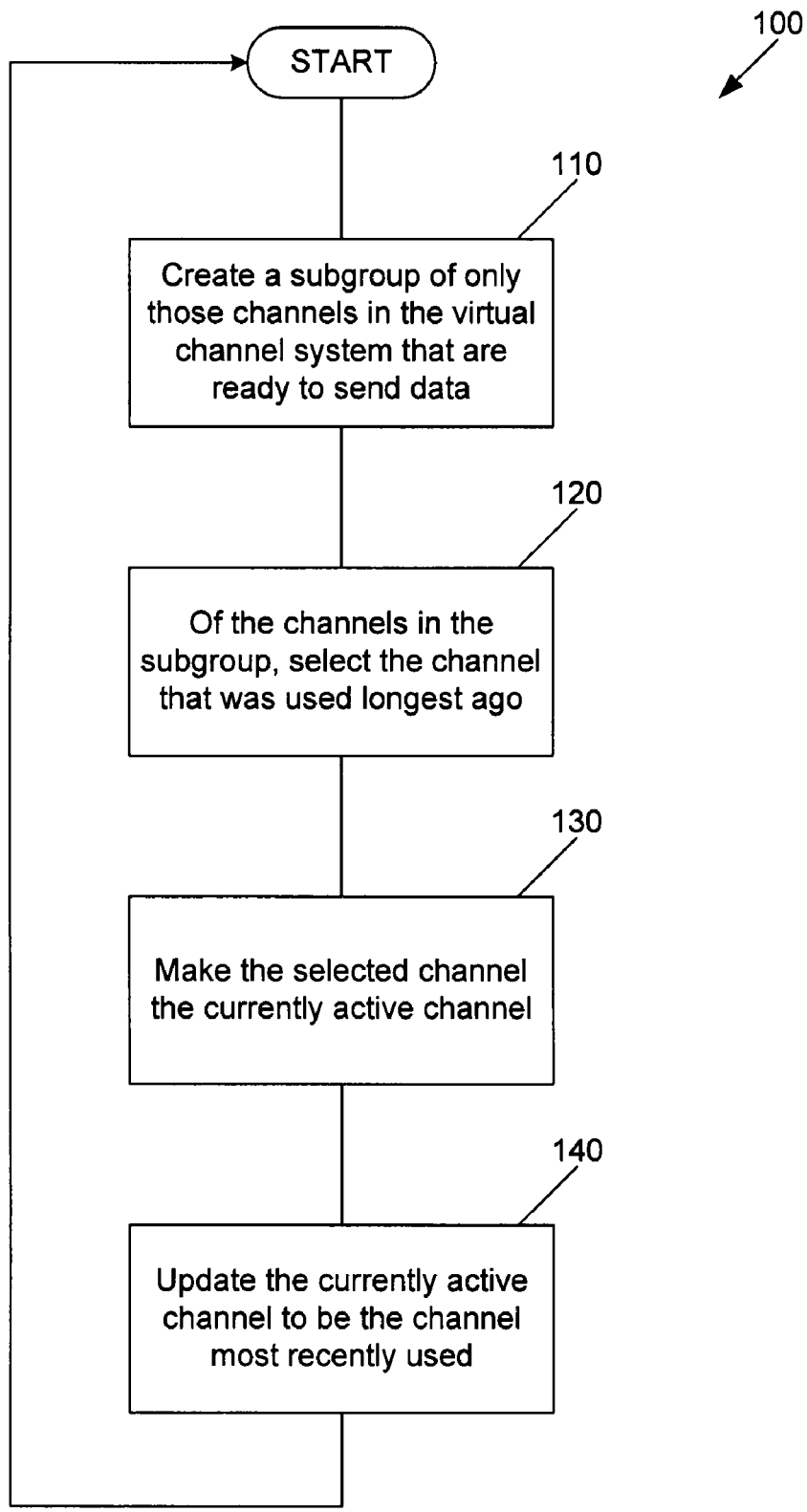
FIG. 5 is an example flow diagram illustrating an example method of selecting the next channel to be used from the available channels in the virtual channel system according to embodiments of the invention.

In one example, the channel select device 82 uses a least-recently-used (LRU) algorithm to determine which of the virtual channels to select as an active virtual channel on the physical channel 72. FIG. 5 is an example flow diagram illustrating a flow 100 that can be used by the channel select device 82 to select the active virtual channel in the channel master 70. Initially, in a process 110, the channel select device 82 creates a subgroup of only those virtual channels in the virtual channel system 60 that are ready to send data. Having data ready to send can be determined by inspecting the forward protocol information that accompanies the data on each virtual channel 0, 1 and by inspecting the reverse protocol information from the successive stage. In the protocol discussed above, having data that is ready to send is indicated by having both of the valid and accept signals asserted for the associated virtual channel. The process 120 then determines, of the virtual channels that are ready to send data, which virtual channel was selected longest ago and selects that virtual channel as the active virtual channel. Such fair arbitration prevents any single virtual channel from dominating the virtual channel system 60. Of course, if a designer wished to always promote one virtual channel over another, for example, if the designer wished to always send data on virtual channel 0 if it is present, regardless of when it was last used, the channel select device 82 could be constructed to operate in such a manner. Other schemes such as fair but unbalanced arbitration could be used, where one virtual channel is generally selected over another, but the non-preferred virtual channel is guaranteed a minimum opportunity to send data. Such a fair scheme prevents a virtual channel from becoming starved, and never selected.

A process 130 generates the appropriate signals for the controller 80 to choose the virtual channel selected in the process 120 as the active virtual channel. For instance, this process could involve using the channel select device 82 to generate the signals to drive the controller 80. The channel select device 82 could use protocol information from the registers 62, 66 plus stored information of which virtual channel was last selected, or other information to make its selection. The process 130 can also control the protocol information by de-asserting the forward protocol information and the reverse protocol information for all but the selected virtual channel.

Finally, the process 140 updates the currently selected channel (the active virtual channel) to be the most-recently-used channel. In operation, in a two-channel virtual channel system, if both virtual channels are always ready to send data, the channel master 70 will simply alternate from one channel to the other, sending data one word at a time across the physical channel until either channel were not ready to send more data. In the case where only one virtual channel is ready to send data, then that channel would occupy the physical channel 72 exclusively.

In an alternative embodiment, the channel select device 82 could also consider the contents of the $33^{rd}$ bit, which as described above can be used to signify the last word in a group or message packet. In such a system, the channel select device 82 could keep a selected virtual channel always selected, provided its valid and accept protocol bits were always asserted, until the $33^{rd}$ bit indicated the end of a message packet before allowing the physical channel 72 to be connected to the other virtual channel. For example, assume both virtual channel 0 and virtual channel 1 include five 33-bit word packets each. In the previous system, described above, the channel master 70 would alternate from channel 0 to channel 1 and back for each interleaving word. Thus, channel 0 would send its last word in the $9^{th}$ data transfer cycle and channel 1 would send its last word in the $10^{th}$ cycle. In the latter-described system, provided virtual channel 0's valid and accept bits were constantly asserted, the channel master 70 would send all five words successively from virtual channel 0 before sending the five words in virtual channel 1. Such an embodiment could be valuable if a subsequent process were waiting idle for an end of a message packet before it could proceed.

Figure 4B:
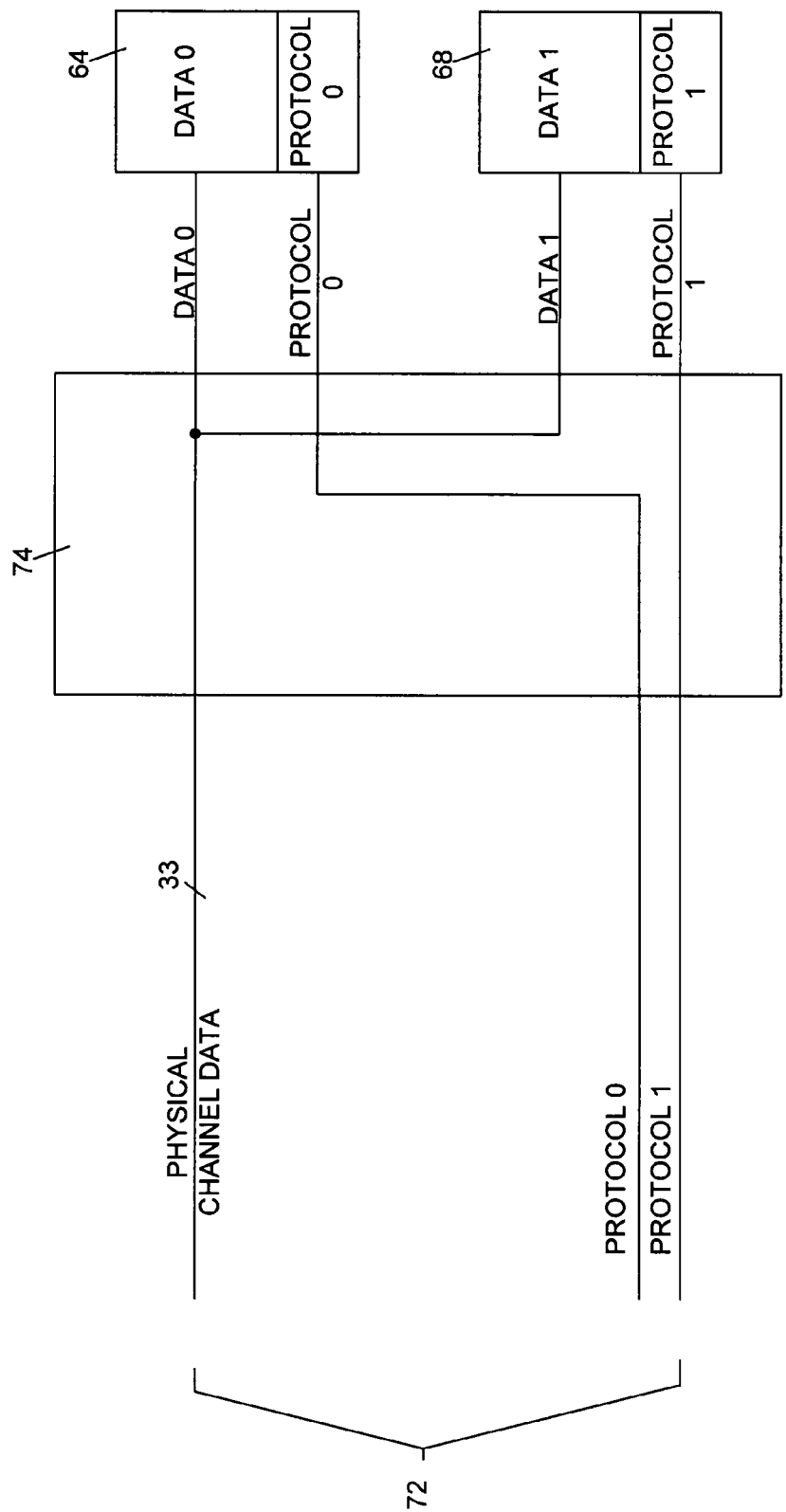

FIG. 4B is a block diagram illustrating an example channel decoder 74. In this efficient embodiment, the decoder simply connects the physical communication lines making up the data portion of the physical channel 72 to both of the connected receiving registers 64, 68. Recall that, in some of the embodiments described above, the valid bit of protocol information of all of the non-selected virtual channels will be de-asserted by the channel master 70, while the valid protocol bit of only the selected virtual channel will be asserted. Therefore, it is not a problem to duplicate data for the non-asserted virtual channel, because its associated protocol information indicating validity will simply be de-asserted in the associated protocol register 64, 68, indicating that the data should not be used. In other embodiments, the channel decoder 74 could inspect which of the virtual channels was selected by inspecting the protocol information, and only store data in the register associated with the selected virtual channel.

Figure 6:
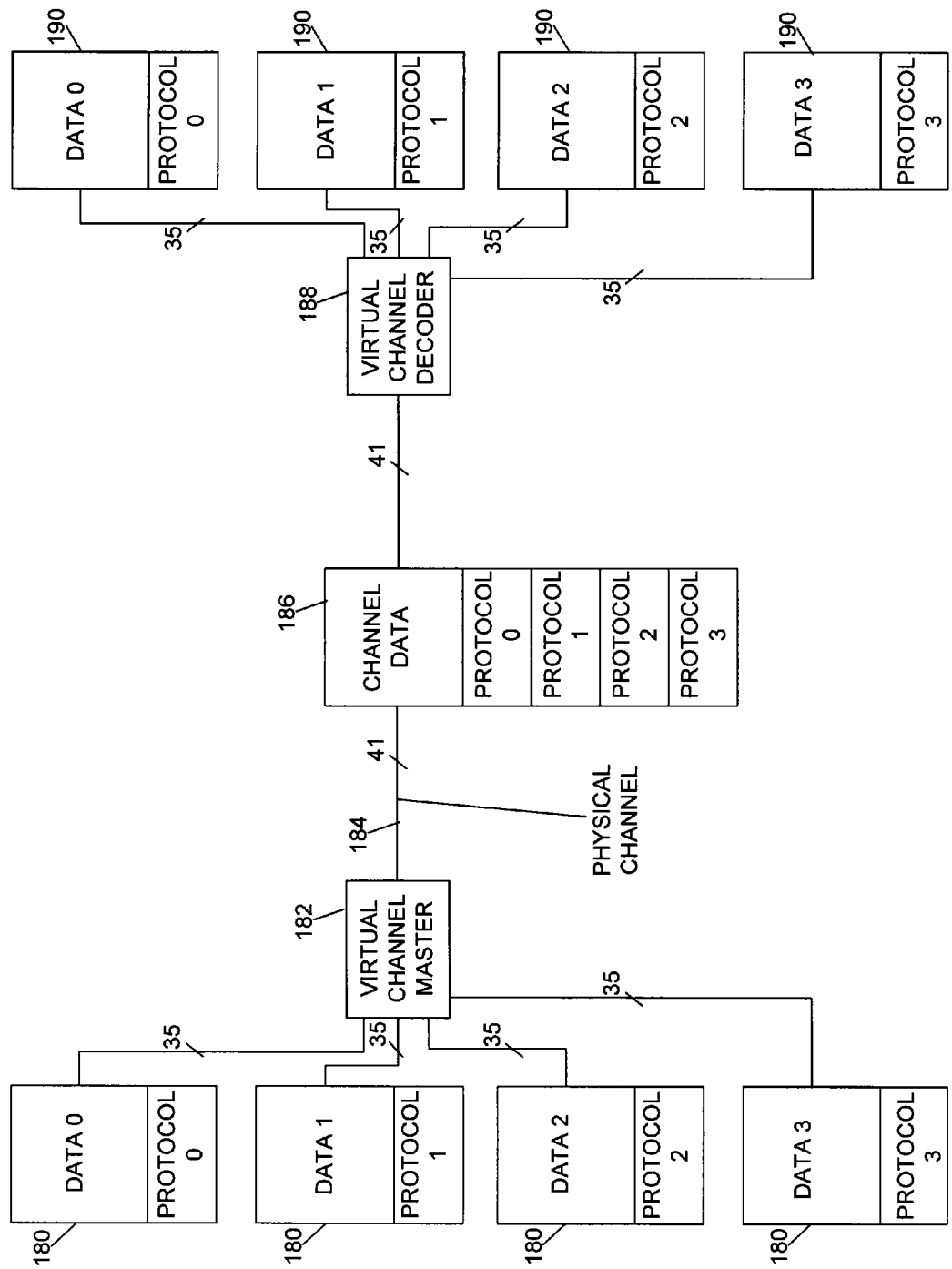
FIG. 6 is a block diagram of a communication system according to embodiments of the invention.

FIG. 6 is a block diagram illustrating a four-channel virtual channel system according to embodiments of the invention. In this example, four sending registers 180, labeled virtual channels 0, 1, 2, and 3 are connected to a virtual channel master 182. The virtual channel master 182 operates as described above and selects which one of the four virtual channels will be connected to the physical channel 184 in any cycle. The virtual channel system illustrated in FIG. 6 can optionally include a storage stage 186. The storage stage 186 includes storage for the data of the selected virtual channel on the physical channel 184 as well as protocol data for all of the virtual channels. Thus, in this example, while there are 35 bits of information (33 data+2 protocol) stored in each sending register 180, the physical channel 184 includes 41 physical communication lines, or is 41 bits wide—33 bits for the physical channel data plus 8 bits of protocol data for all of the connected virtual channels. In the system illustrated in FIG. 6, the 41 bits from the storage stage 186 are presented to the virtual channel decoder 188 in every clock cycle, where they are directed into the individual receiving registers 190.

Figure 7:
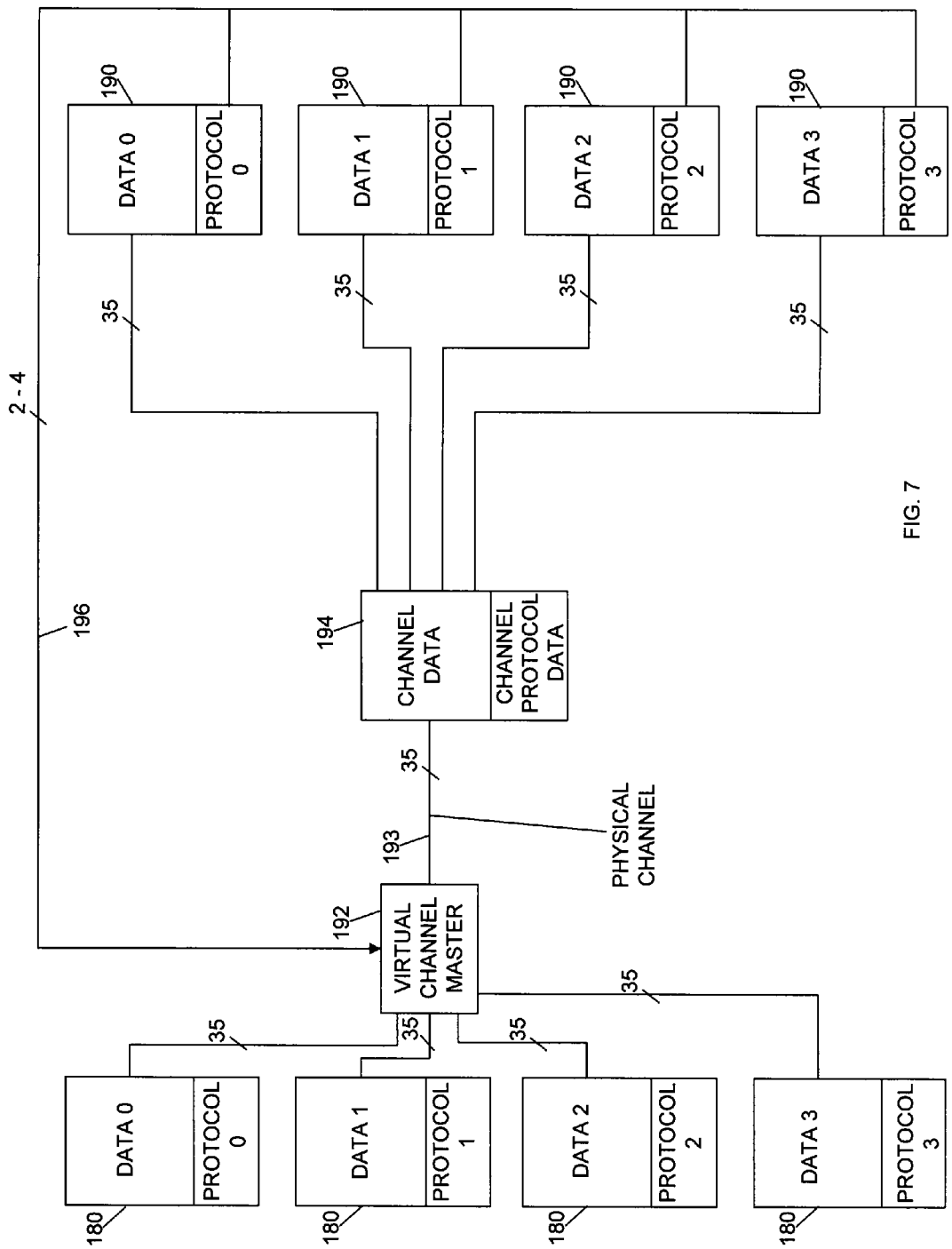
FIG. 7 is a block diagram of a communication system operating in multiple clock domains according to embodiments of the invention.

FIG. 7 illustrates a data transfer system similar to the system illustrated in FIG. 6. The primary difference between the two systems is that the system in FIG. 7 has a physical channel 193 that is only as wide as a single one of the sending registers 180. In FIG. 7, the physical channel 193 is 35 bits wide. By contrast, the physical channel 184 in FIG. 6 is 41 bits wide, which was wide enough to transmit all the data in the sending register of one of the virtual channels, plus the protocol data in all of the sending registers. Although the system of FIG. 7 may have lower hardware costs than the system of FIG. 6, because of the fewer wires and storage registers in its physical channel 193, there would be increased communication overhead, however. Some information about which virtual channel that is active on the physical channel 193 would need to be communicated between the virtual channel master 192 and the receiving registers 190. Such communication could come in the form of a channel number transmitted before or after the virtual channel data is sent over the physical channel 193, or could be some other communication protocol, such as information transmitted over a back channel information line 196 coupled between the receiving registers 190 and the virtual channel master 192. To save physical resources, the back channel information line 196 could carry encoded data.

Figure 8:
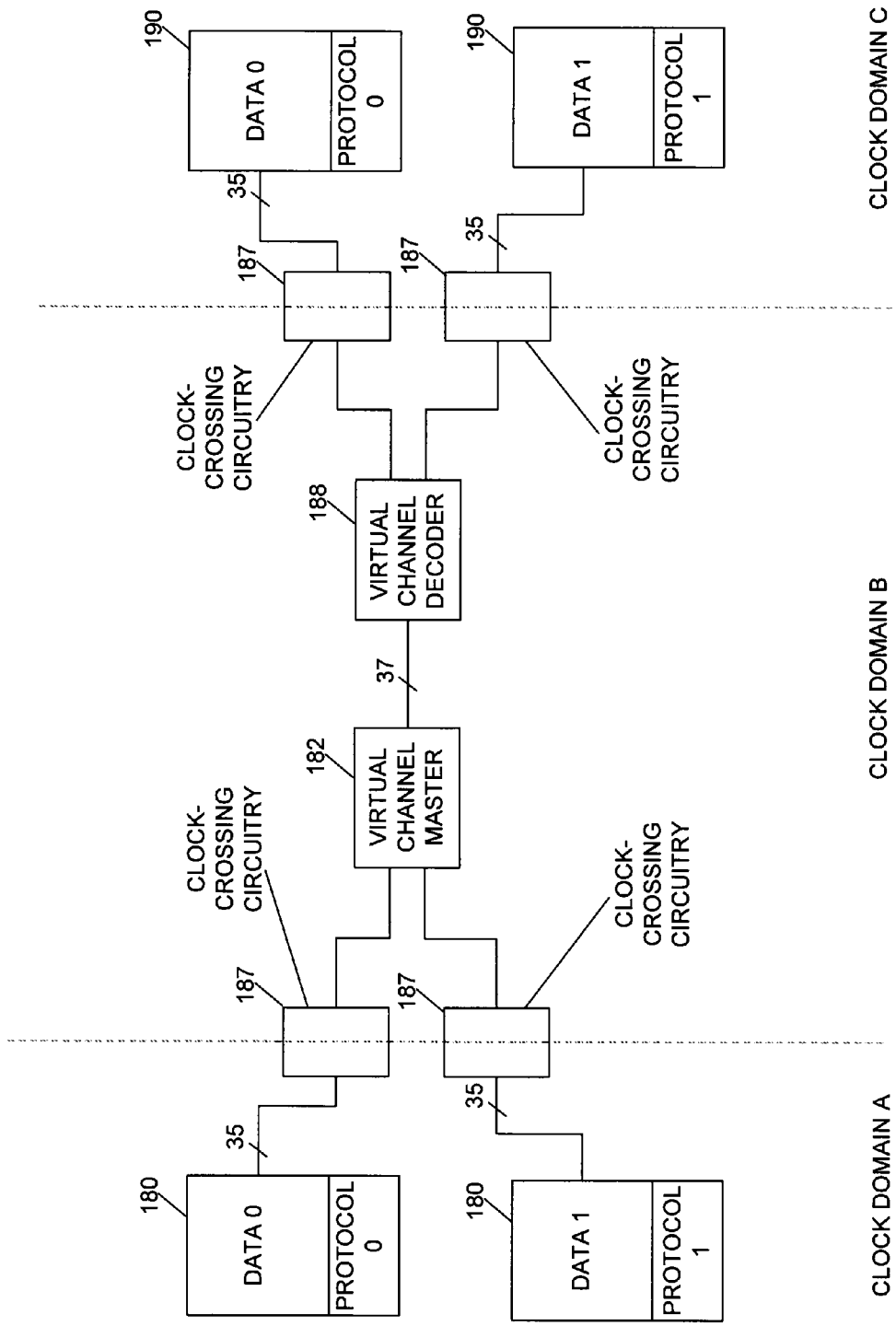
FIG. 8 is a block diagram of a second communication system functionally similar to the structure illustrated in FIG. 6.

FIG. 8 illustrates another data transfer system similar to the systems of FIGS. 6 and 7. The primary difference between the system of FIG. 8 and these others is the presence of clock-crossing circuitry 187 separating the virtual channel master 182 from the sending registers 180 and receiving registers 190. Such clock-crossing circuitry could include those circuits described in the above-referenced and incorporated provisional patent application 60/702,727. The presence of such clock-crossing circuits 187 allow the virtual channel master 182 to operate in its own clock domain, such as clock domain B, while the sending registers 180 are in clock domain A, and the receiving registers are in clock domain C. For example, the clock domain A could operate at 200 MHz, clock domain C at 400 Mhz, and clock domain B at 800 MHz. In another embodiment, clock domains A and C could operate at a first speed, while clock domain B operates at a higher speed. For instance, domains A and C could operate at 200 MHz while clock domain B operates at 400 MHz. In such an embodiment, data could be sent along the physical channel twice as fast as it was delivered to the sending registers 180, effectively keeping both virtual channels 0 and 1 running at full speed. In one particularly efficient embodiment, the clock rate of the domain that includes the physical channel runs at a multiple of the clock rate of the data sending registers, with the multiple being equal or above the number of virtual channels connected to the physical channel. In such embodiments, the physical channel effectively removes data from the data sending registers in a single clock cycle, as measured by the clock rate of the data sending registers, because the physical channel operates much faster than the sending registers.

Due to the careful protocol control described above, each element in the system of FIG. 8 can operate independently without risk of losing information when crossing clock boundaries. Although three separate clock domains are illustrated in FIG. 8, the actual number could be fewer or greater.

Figure 9:
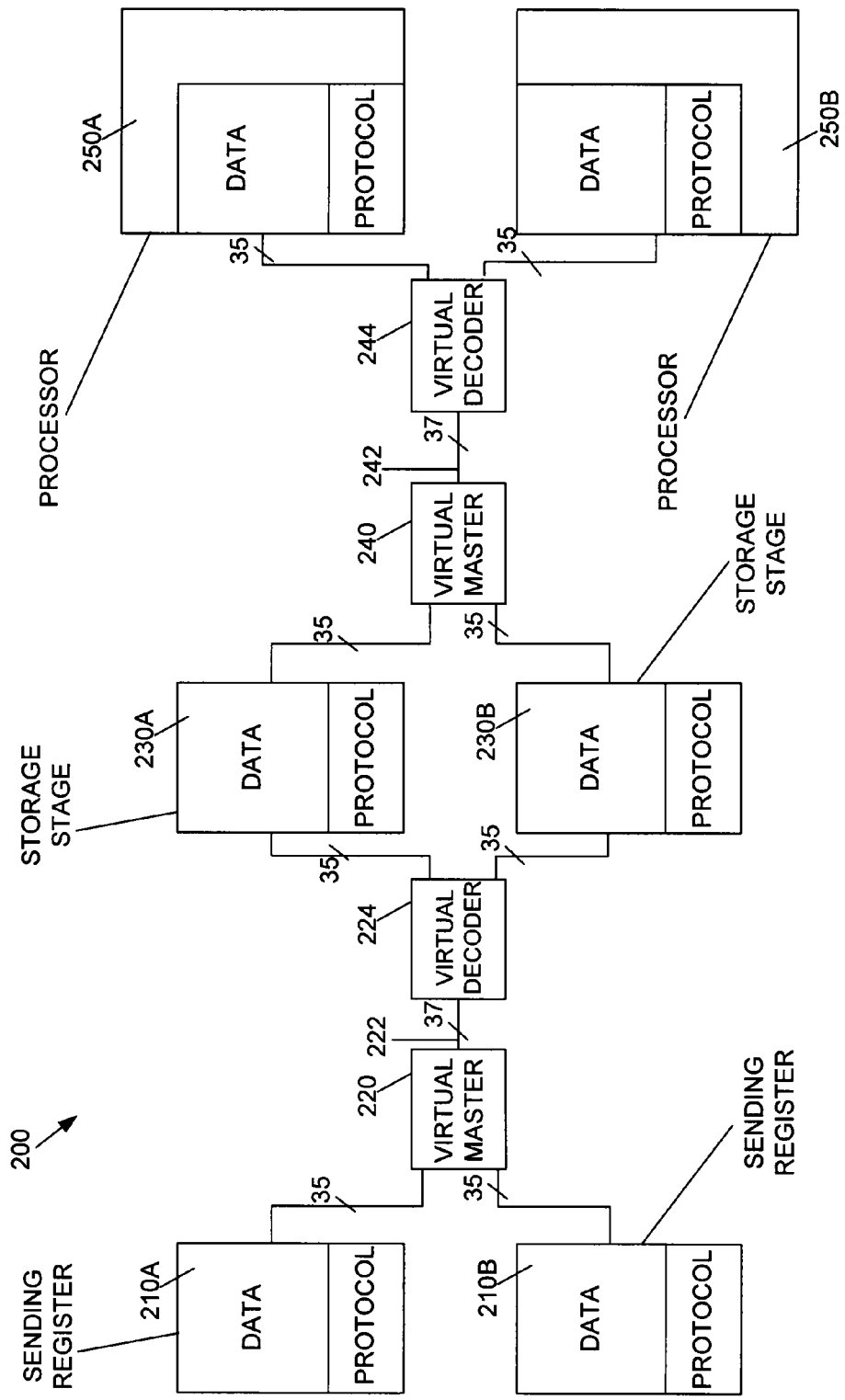
FIG. 9 is a schematic diagram of a communication system including multiple virtual channel systems according to embodiments of the invention.

FIG. 9 illustrates an example data transfer system 200 including two sets of two-channel virtual channels according to embodiments of the invention. Two sending registers 210A, 210B can take the same form as the sending register 62 described above, with a selection for one or more data elements and a selection for one or more protocol elements. Both the sending registers 210A, 210B are coupled to a virtual channel master 220, which operates as described above with reference to FIGS. 3-5.

The destination for the data that is stored in the sending registers 210A, 210B, is input ports of two processors, 250A, 250B. In this example, the processor 250A receives data sent from the sending register 210A, while the processor 250B receives data sent from the sending register 210B.

Optionally, between the sending registers 210 and the processors 250 are a set of storage stages 230A and 230B and two virtual channel decoders 224, 244. In this example, after being decoded by the channel decoder 224, the storage stage 230A temporarily stores data from the sending register 210A, while the storage stage 230B temporarily stores data from the sending register 210B. Another virtual channel master 240 is coupled to both the storage stages 230A, 230B, with the other channel decoder 244 coupled to the processors 250A, 250B. The virtual masters 220 and 240 and the virtual decodes 224 and 244 may behave identically.

In operation, the virtual channel master 220 selects data from one of the sending registers 210A or 210B to be placed on a physical channel 222, using the methods described above. The channel decoder 224 then removes the data from the physical channel and stores it in its respective storage stage 230A or 230B. Next, the channel master 240 selects data from one of the storage stages 230A or 230B and places it on the physical channel 242, where it is decoded by the channel decoder 244 into its appropriate input port of the processor 250A or 250B.

Note that when data is temporarily stopped in any one of the pairs of sending registers 210, storage stages 230, or processors 250, that data can still flow across the physical channels 222, 242. For instance, if the storage stage 230A is blocked, because either the valid or accept values of its protocol data is de-asserted, the virtual channel master 240 can still place data from storage stage 230B on the physical channel 242, for ultimate delivery to the processor 250B. As another example, if the processor 250B is blocked, then the channel master 220 can place data from the sending register 210A onto physical channel 222, and the channel master 242 can place data from the storage stage 230A onto the physical channel 242. Thus, data can still flow across the physical channels 222, 242 even though some of the components on either side of the physical channels are in a blocking state.

Recall also that the storage stages 230A, 230B can be structured to store more than one or two data words, i.e., they can be structured to have a depth greater than '1', effectively making a FIFO (First In First Out) buffer of stored data, or other storage structure. Deeper FIFO buffers will, in general, keep the physical channels active more than having only single word storage because their associated physical channels are more active if data is always available to be placed on the physical channels and not idle. Of course, having deeper FIFO buffers comes at an increased hardware cost to store the additional data.

Figure 10:
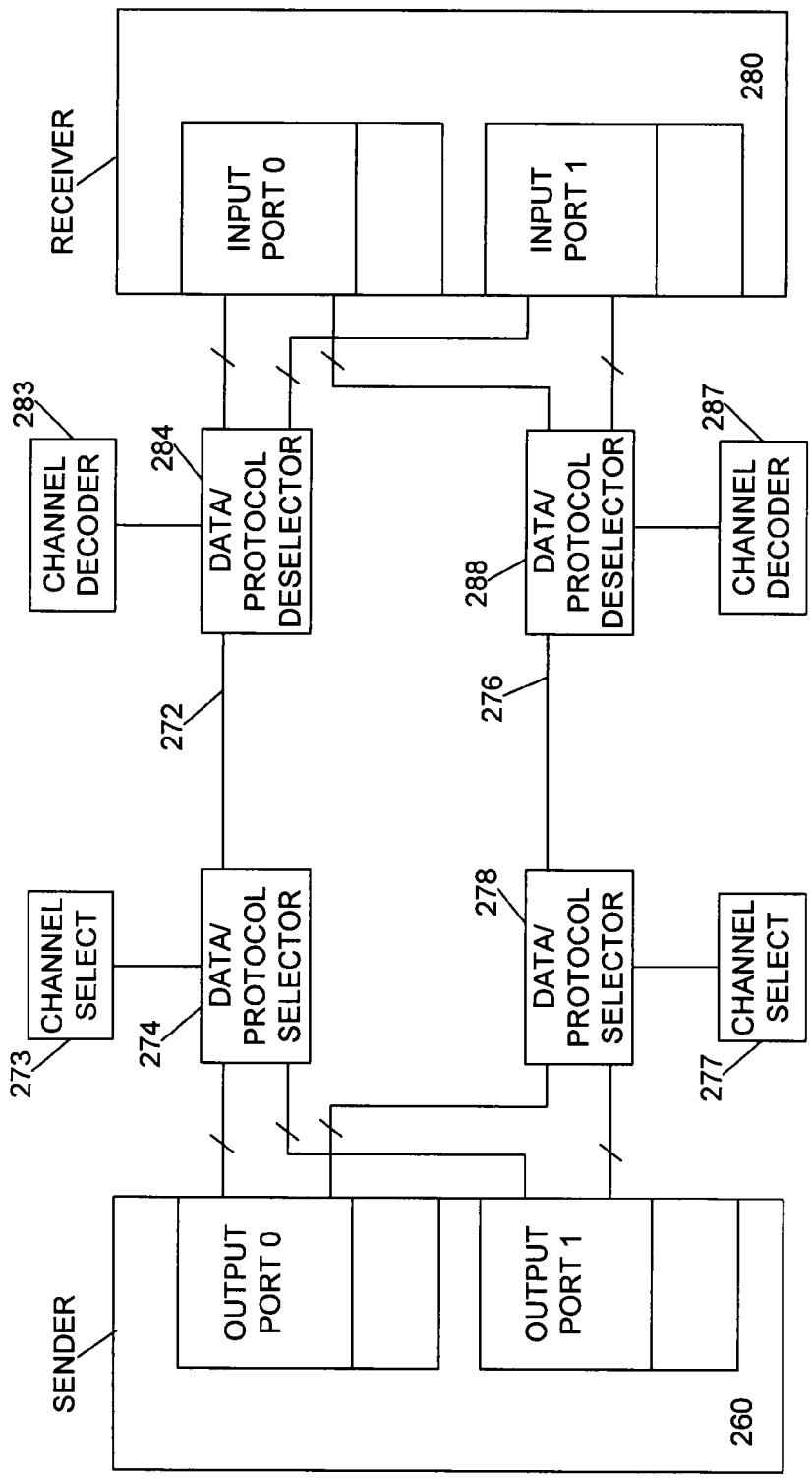
FIG. 10 is a schematic diagram illustrating a programmable communication channel structure according to embodiments of the invention.

FIG. 10 is a block diagram illustrating a communication system of two programmable communication channels that may be used in various embodiments of the invention. A sender 260 includes two output ports 0 and 1 while a receiver 280 includes two input ports 0 and 1. Two communication channels 272, 276 connect the sender 260 with the receiver 280. Either of the output ports 0 or 1 can be connected to either of the communication channels 272, 276. Specifically, both of the output ports 0, 1 are connected to selection devices 274 and 278, which each control the switching of the data and protocol in both the forward and reverse direction. Connected to the selection device 274 is a channel select 273, which controls which of the output ports 0, 1 will be connected to the communication channel 272. The channel select 273 may be a simple electrical signal or it may be a signal stored in a memory element, for instance. If the channel select 273 includes a memory element, the selection device 274 can be pre-programmed to connect the selected port to the communication channel 272. The channel select 277 operates in the same manner to control the selection device 278. Note that the channel selects 273 and 277 may both be set to connect the same port, such as output port 0, to both of the communication channels 272 and 276 simultaneously. More typically, each single output port would be mapped or selected to a single channel 272 or 276.

At the receiving end of the channel, a de-selection device 284, 286 routes the signal from the channel 272, 276 to the desired input port. The channel decode information is provided by the channel decoders 283, 287, which provide a signal to the respective de-selection devices 284, 288. For instance, the channel decode signal 283 can be set to couple the data from physical channel 272 to input port 0 while the channel decode signal 287 could be set to couple the physical channel 276 to input port 1. Such programmable channels can be used in conjunction with the virtual channel system of data communication with developing systems.

Figure 11:
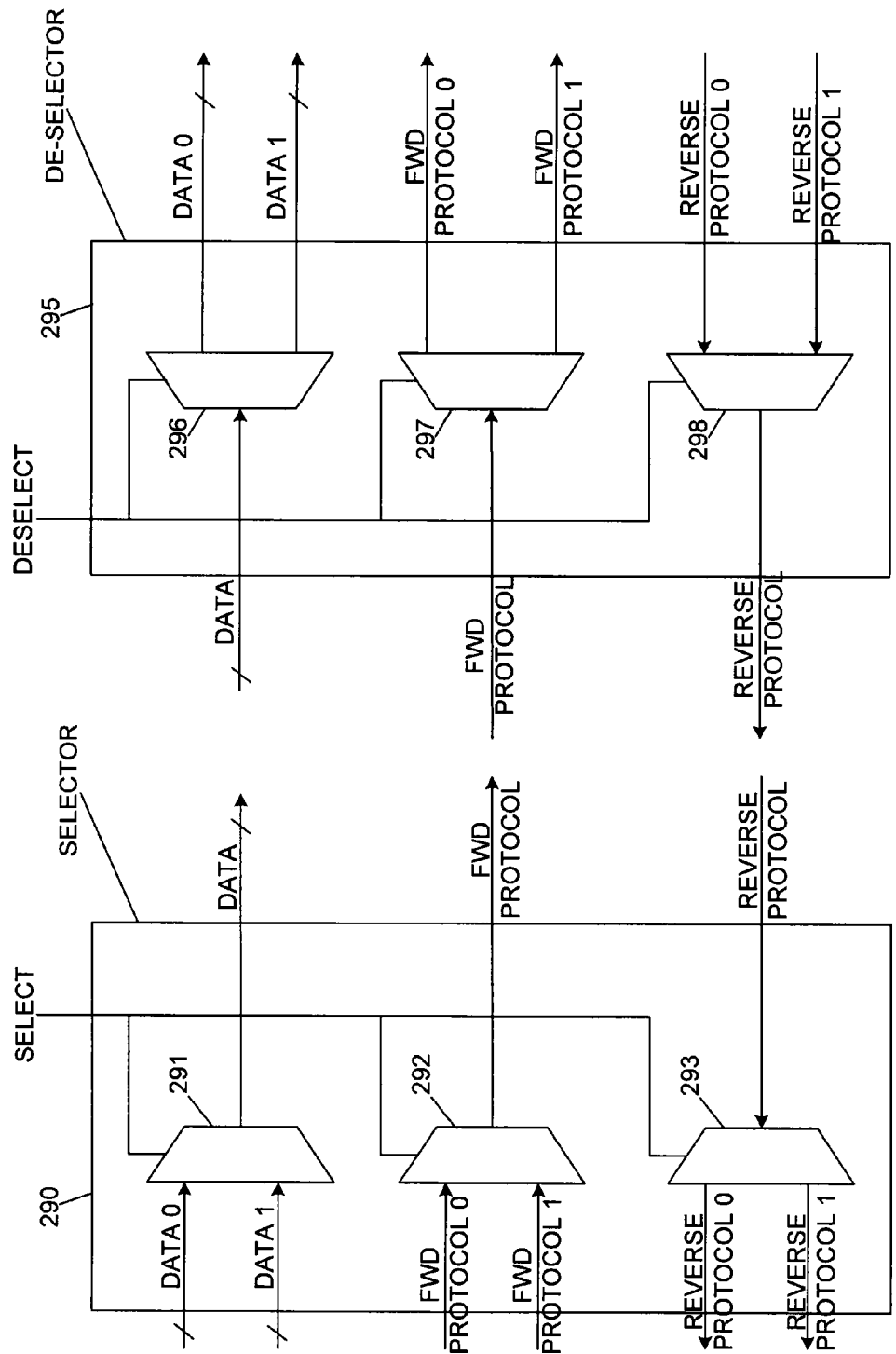
FIGS. 11A and 11B illustrate example components that can be used in the programmable communication structure of FIG. 10, according to embodiments of the invention.

FIG. 11A illustrates an example data/protocol selector 290 that can be used as the selectors 274, 278 illustrated in FIG. 10. In this instance, the selector 290 has two channels, channel 0 and channel 1, each of which includes forward protocol information and reverse protocol information. As described above, the forward protocol information may represent an indication that the associated data is valid, while the reverse protocol information may represent an indication that a successive element is ready to accept data. In other embodiments, the forward protocol may indicate a "request" signal while the reverse protocol indicate an "acknowledge" that it has received information.

Within the data/protocol selector 290 are a series of individual selectors, 291 and 292, represented in FIG. 11A by multiplexers, and an individual selector 293, represented by a de-multiplexer. The selectors 291 and 292 each include two inputs and a single output, while the selector 293 has a single input and two outputs. If the selector 290 were connected to more input channels, then each of the selectors 291, 292, and 293 would also include a likewise increased number of inputs. A selection signal controls which of the inputs 0 or 1 are selected as the output of selectors 291, 292, and the same selection signal controls which output, 0 or 1 the input to selector 293 will be connected to. In operation, for example, making a first selection to the data/protocol selector 290 sets the inputs data 0 and forward protocol 0 as the data and forward protocol outputs, and simultaneously selects the reverse protocol input to be the reverse protocol 0 output. The other selection would make the same inputs and outputs select channel 1. In a case where the data/protocol selector 290 is coupled to more than two channels, then the select has additional states, one for each channel.

FIG. 11B illustrates an example data/protocol de-selector 295 that can be used as the de-selectors 284, 288 illustrated in FIG. 10. In this instance, the de-selector 295 has two channels, channel 0 and channel 1, each of which includes forward protocol and reverse protocol information. Within the data/protocol de-selector 295 are a series of individual selectors, 296 and 297, represented in FIG. 11B by de-multiplexers, and an individual selector 293, represented by a multiplexer. The selectors 296 and 297 each include a single input and two outputs, while the selector 298 has a pair of inputs and a single output. If the de-selector 295 were connected to more input channels, then each of the selectors 296, 297, and 298 would also include a likewise increased number of inputs. A selection signal controls which of the inputs 0 or 1 are selected as the input of selectors 296, 297, and the same selection signal controls which input, 0 or 1 the output of selector 298 will be connected to. In operation, for example, making a first selection to the data/protocol de-selector 295 sets the data and forward protocol inputs to the data 0 and forward protocol 0 channels, and simultaneously selects the reverse protocol channel 0 as the reverse protocol output from the selector 298. The other selection would make the same inputs and outputs select channel 1. In a case where the data/protocol de-selector 295 is coupled to more than two channels, then the select has additional states, one for each channel.

Figure 12:
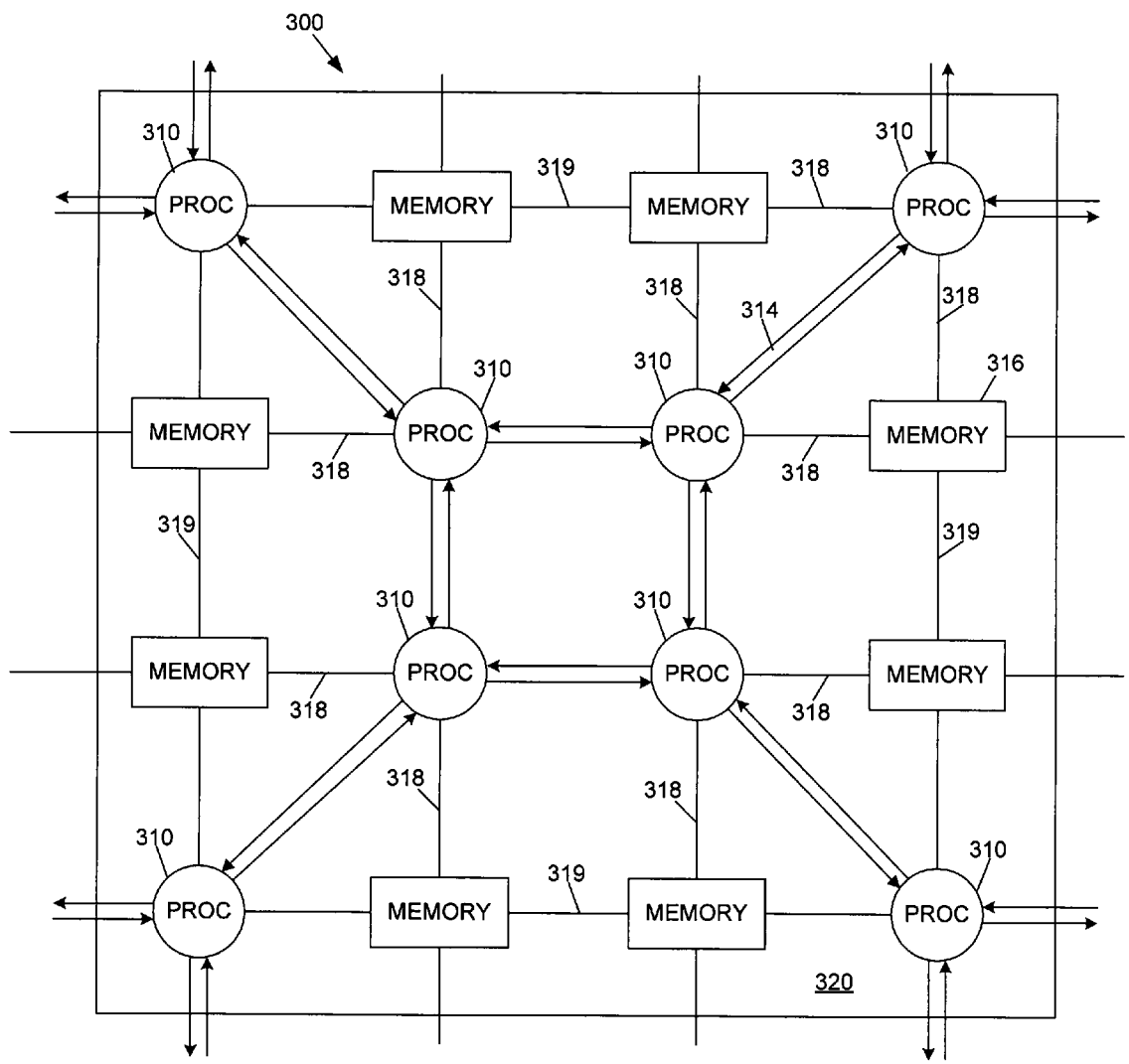
FIG. 12 is a block diagram of another communication system in an arrangement of processors according to further embodiments of the invention.

FIG. 12 illustrates an example local communication system 300 among a group of eight processing units, or processors 310. Each of the processors 310 in the system 300 each have three local communication channels 314: a vertical connection, a horizontal connection, and a diagonal connection. The communication channels 314 connect one processor unit 310 to another processor. The local channels 314 can be bi-directional or uni-directional. In some embodiments, like the embodiment illustrated in FIG. 12, the channels 314 are uni-directional, but there are two uni-directional channels between each processor 310, each uni-directional in an opposite direction. Having such a configuration effectively gives a bi-directional communication system between any two processors 310, but each direction operates independently. Any or all of the local communication channels may include virtual channels.

Also illustrated in FIG. 12 are eight memory units 316. The processors 310 are coupled to neighboring memory units 316 through a memory bus 318. Memory units 316 may also be directly coupled to other memory units 316 though a multi-bit memory interconnect 319. The arrangement of processing units and memory units as outlined in FIG. 12 is called a tile 320, which may be an element of a larger system. In such a larger system, the processing units 310 at the corners of the tiles 320 can be connected to processors 310 of neighboring tiles, and memory units 318 can be coupled to adjacent memory units 316 in other tiles.

Figure 1:
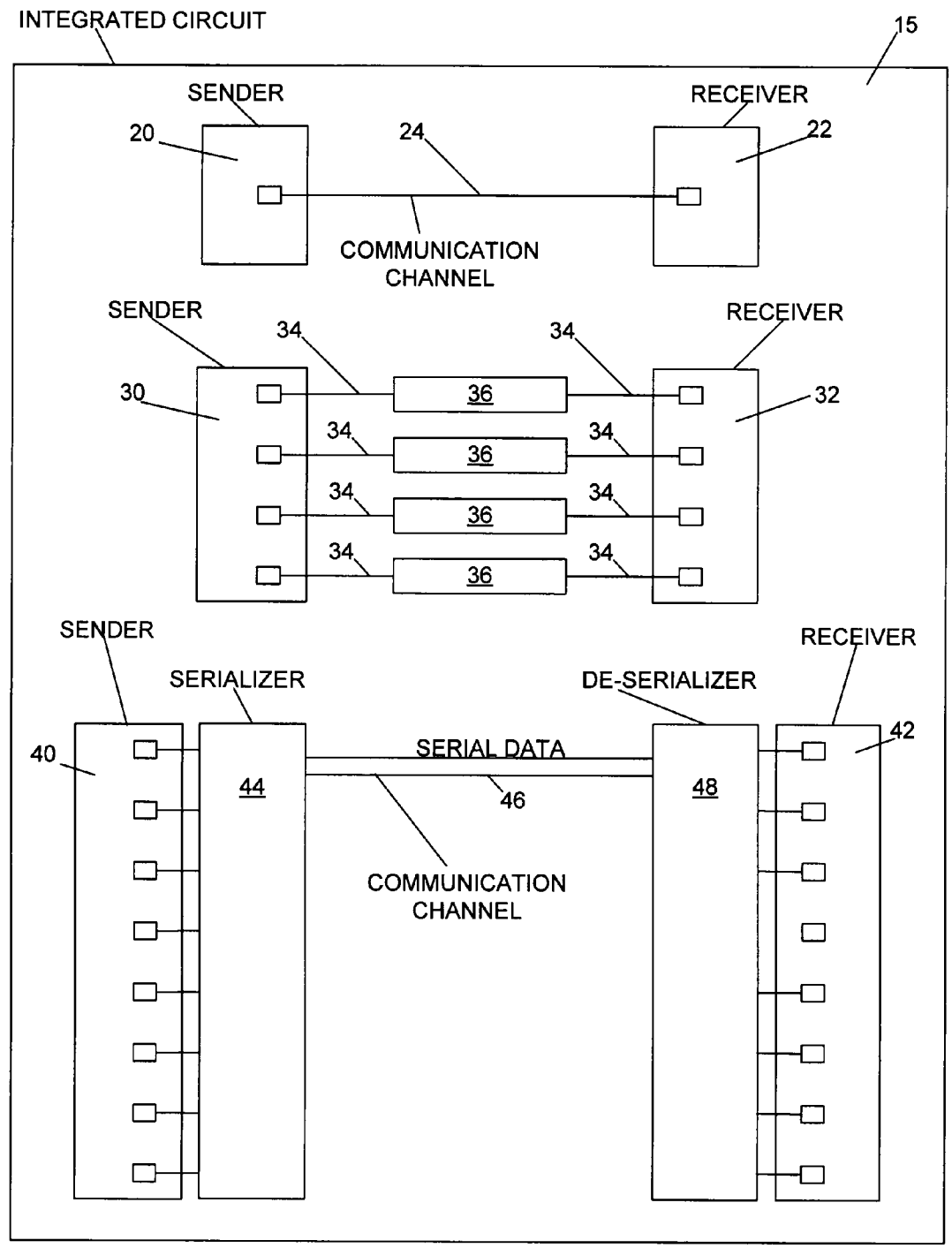
FIG. 1 is a block diagram of various integrated circuit communication systems according to the prior art.

The communication channels 314 transfer data between two of the processors 310. The communication channels 314 can take the form of the multi-bit virtual channels described with reference to FIGS. 3-9, the programmable channels described with reference to FIGS. 10 and 11, the standard channels illustrated in FIG. 1, or other types of communication channels not illustrated but known in the art, and/or combinations of all of these types of communication channels. The communication channels 314 may include one or more sets of storage registers (not shown) to temporarily store data as it is sent between processors 310. In some embodiments, communication channels 314 may cross clock boundaries and therefore may include clock-crossing circuitry to ensure proper data transmission between the processors 310, as described above with reference to FIG. 8.

Figure 13:
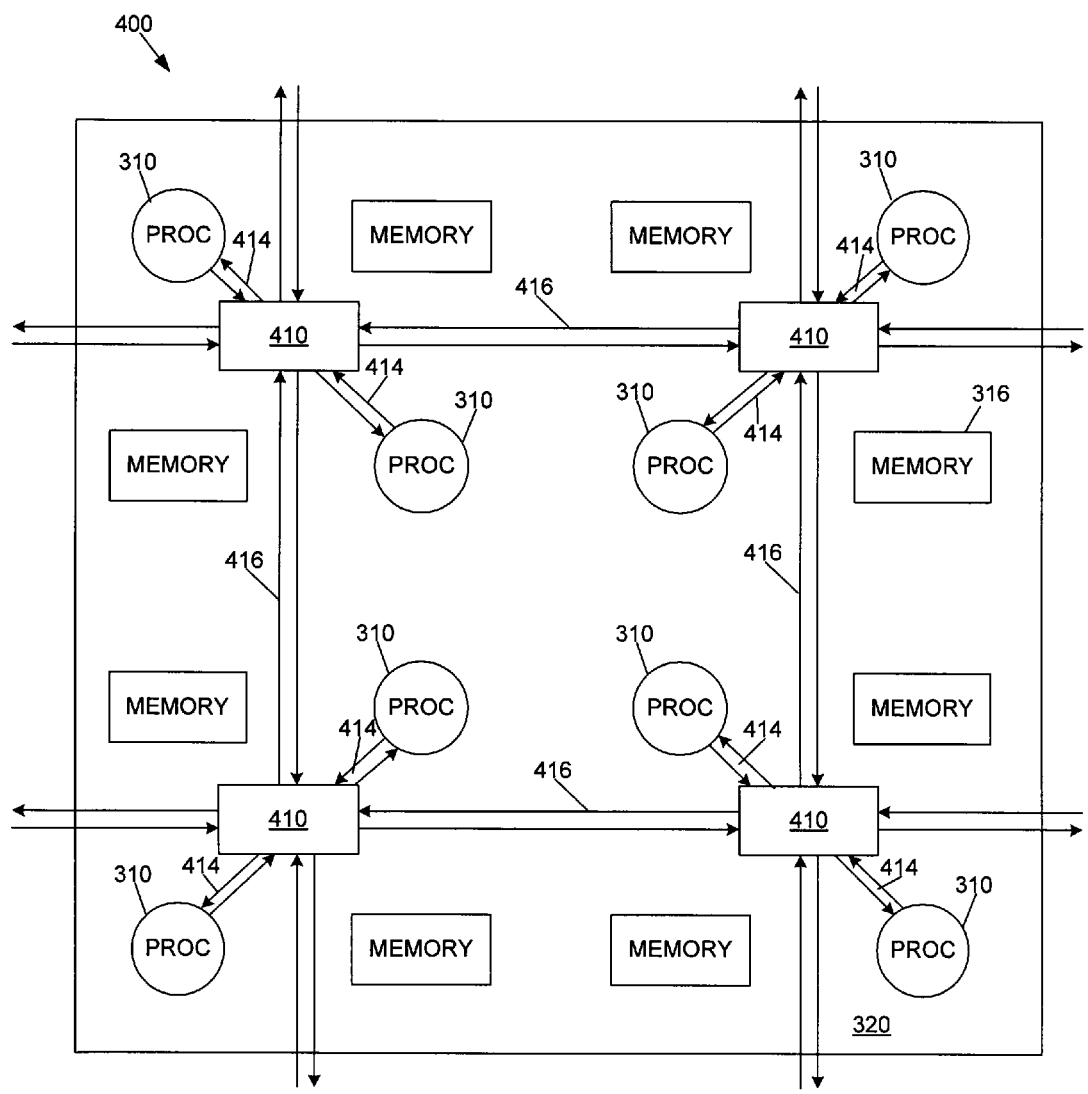
FIG. 13 is a block diagram illustrating a further communication system within an arrangement of components according to further embodiments of the invention.

FIG. 13 illustrates another communication system 400, which can be thought of as another level of communication within an integrated circuit. The communication system 400 is an 'intermediate' distance network and includes switches 410, communication lines 414 to processors 310, and communication lines 416 between switches. In this embodiment, as shown, the network 400 does not connect to the memory modules 316, but could be implemented in such a way, if desired. In FIG. 13, four switches 410 are included per tile 320, and are connected to other switches in the same or neighboring tiles in the north, south, east, and west directions. In border cases around edges of an integrated circuit, the switch 410 may instead couple to an Input/Output block (not shown). Thus, in this example, the distance between the switches 410 is one-half of the distance across a tile 320, although other distances and connection topologies can be implemented without deviating from the scope of the invention.

In operation, any processor 310 can be coupled to and can communicate with any other processor 310 on any of the tiles 320 by routing through the correct series of switches 410 and communication lines 404, 416. For instance, to send communication from the processor 310 in the lower left hand corner to the processor 310 in the upper right corner, three switches 410 (the lower left, upper right, and one of the possible two switches in between) could be configured in a circuit switched manner to connect the processors 310 together. The same communication channels could operate in a packet switching network as well, using addresses for the processors 310 and including routing tables in the switches 410, for example.

Figure 14:
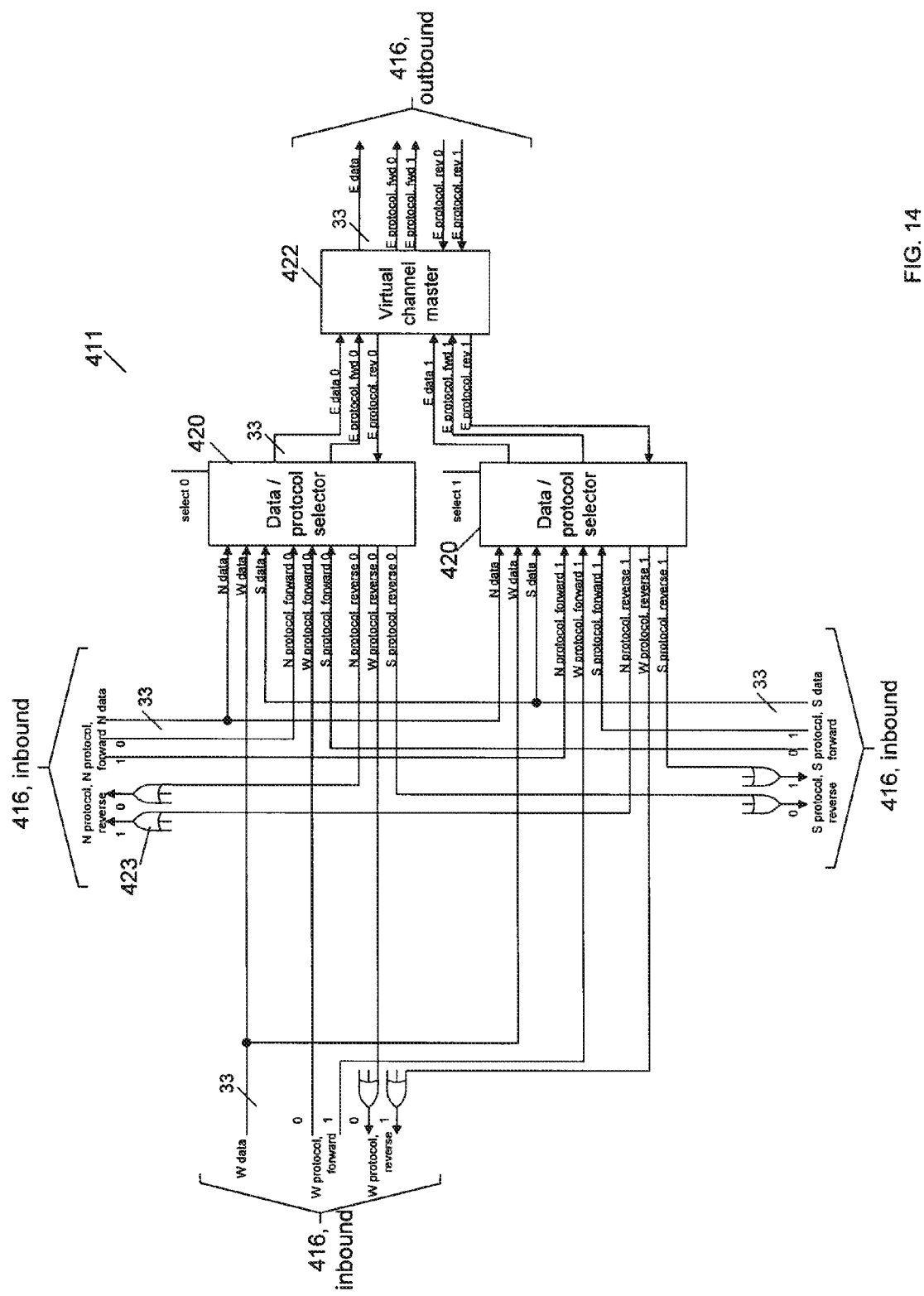
FIG. 14 is a block diagram of an example of a programmable network switch of FIG. 13 that uses virtual channels according to embodiments of the invention.

FIG. 14 is a block diagram of a portion of an example switch structure 411 including two virtual channels on its communication lines 416. For clarity, only a portion of a full switch 410 of FIG. 13 is shown, as will be described. Generally, various lines and apparatus in the East direction illustrate components that make up output circuitry, only, including communication lines 416 in the outbound direction, while the North, South, and West directions illustrate inbound communication lines 416, only. Of course, even in the "outbound" direction, which describes the direction of the main data travel, there are input lines, as illustrated, which carry reverse protocol information. Similarly, in the "inbound" direction, reverse protocol information is an output. To create an entire switch 410 (FIG. 12), the components illustrated in FIG. 13 are duplicated three times, for the North, South, and West directions.

A virtual channel master 422 operates similar to the virtual channel master 70 of FIG. 3. It selects sets of data and protocol data from one of two sources, in this case the data portion of output from one of two data/protocol selectors 420, and places the selected set of data and protocol information for both sources on the outbound communication lines 416 in the East direction. It simultaneously connects the reverse protocol information for the selected channel to the appropriate data/protocol selector 420.

The pair of data/protocol selectors 420 can be structured similar to and operate similar to the data/protocol selector 290 of FIG. 11A. Each data/protocol selector 420 is controlled to select one of three possible inputs, North, South, or West. Each selector 420 operates on a single channel, either channel 0 or channel 1 from the inbound communication lines 416. Each selector 420 includes a selector input to control which input, channel 0 or 1, is coupled to its outputs. In a system with a different number of virtual channels, the selector input could choose one among all of them. The selector input can be static or dynamic. Each selector 420 operates independently, i.e., the selector 420 for virtual channel 0 may select a particular direction, such as North, while the selector 420 for virtual channel 1 may select another direction, such as West. In other embodiments, the selectors 420 could be configured to make selections from any of the virtual channels, such as a single selector 420 sending outputs from both West channel 1 and West channel 0 to the channel master 422, but such a set of selectors 420 would be larger and use more component resources than the one described above.

Connections between the data/protocol selectors 420 and the inbound communication lines 416 operate similar to the virtual channel decoder 74 illustrated in FIGS. 3 and 4A. For example, data lines from the North inbound communication line 416 are connected to both selectors 420, once for channel 0 and once for channel 1. Protocol lines of the communication lines 416, in both the forward and reverse directions are also routed to the appropriate selector 420. In other embodiments, a separate hardware device or process (not shown) could inspect the forward protocol lines of the inbound lines 416 and route the data portion of the inbound lines 416 based on the inspection. The reverse protocol information between the selectors 420 and the inbound communication lines 416 are grouped through a logic gate, such as an OR gate 423 within the switch 411. Other inputs to the OR gate 423 would include the reverse protocol information from the selectors 420 in the West and South directions. Recall that, relative to an input communication line 416, the reverse protocol information travels out of the switch 411, and is coupled to the component that is sending input to the switch 411.

The version of the switch 411 illustrated in FIG. 14 has only communication lines 416 to it, which connect to other switches, and does not include communication lines 414, which connect to the processors 310. A version of the switch 410 that includes communication lines 414 connected to it is described below.

Figure 15:
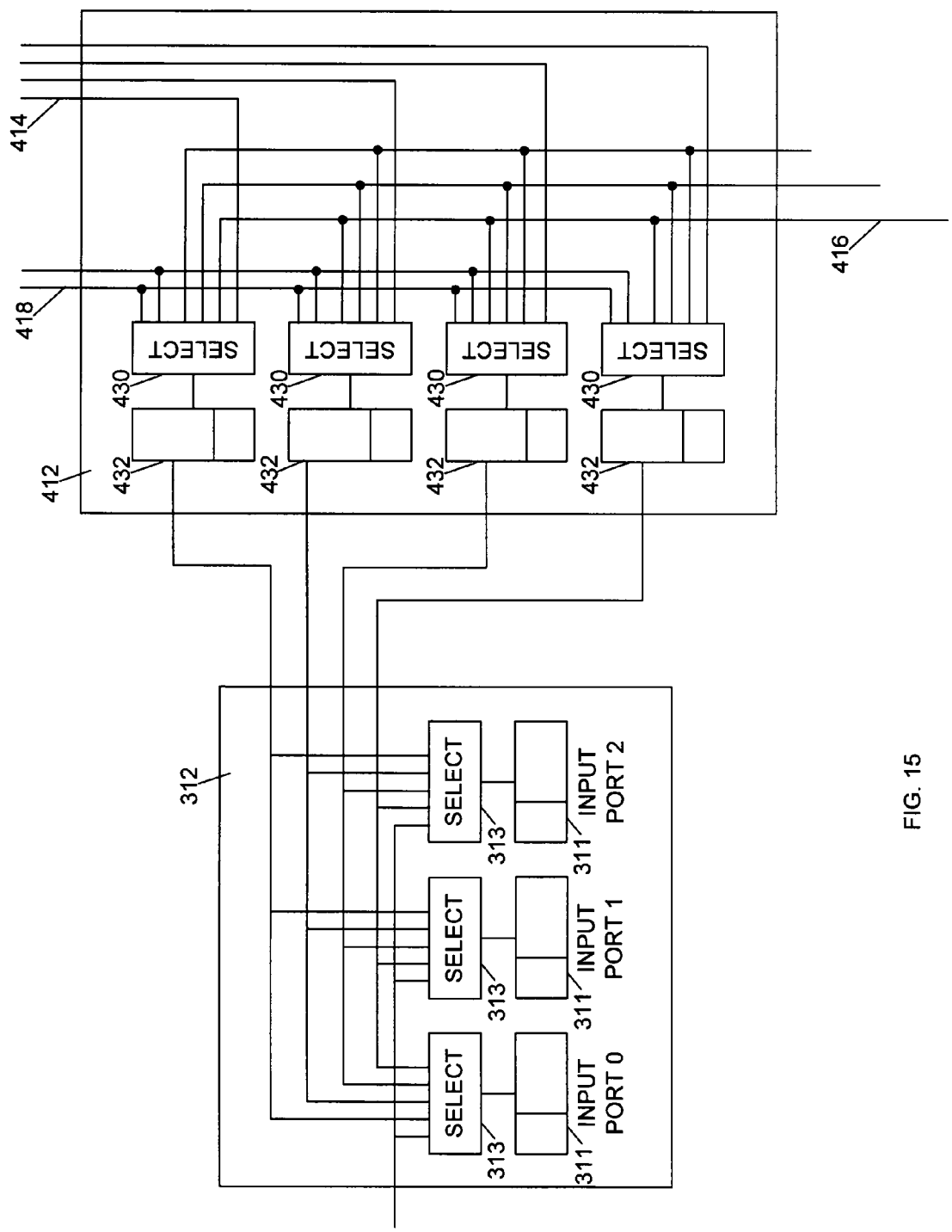
FIG. 15 is a block diagram of an example of programmable interface between a portion of a network switch and input ports of an electronic component as in FIG. 11 according to embodiments of the invention.

FIG. 15 is a block diagram of a switch portion 412 of an example switch 410 connected to a portion 312 of an example processor 310. The processor 312 in FIG. 15 includes three input ports, 0, 1, 2. The switch 412 of FIG. 15 includes four selectors 430, which operate similar to the selectors 420 of FIG. 13. By making appropriate selections, any of the communication lines 414, 416 (FIG. 13), or 418 (described below) that are coupled to the selectors 430 can be coupled to any of the output ports 432 of the switch 412. The output ports 432 of the switch 412 may be coupled through another set of selectors 313 to a set of input ports 311 in the connected processor 312. The selectors 313 can be programmed to set which output port 432 from the switch 412 is connected to the particular input port 311. Further, as illustrated in FIG. 15, the selectors 313 may also be coupled to an internal communication line for selection into the input port 311.

Figure 16:
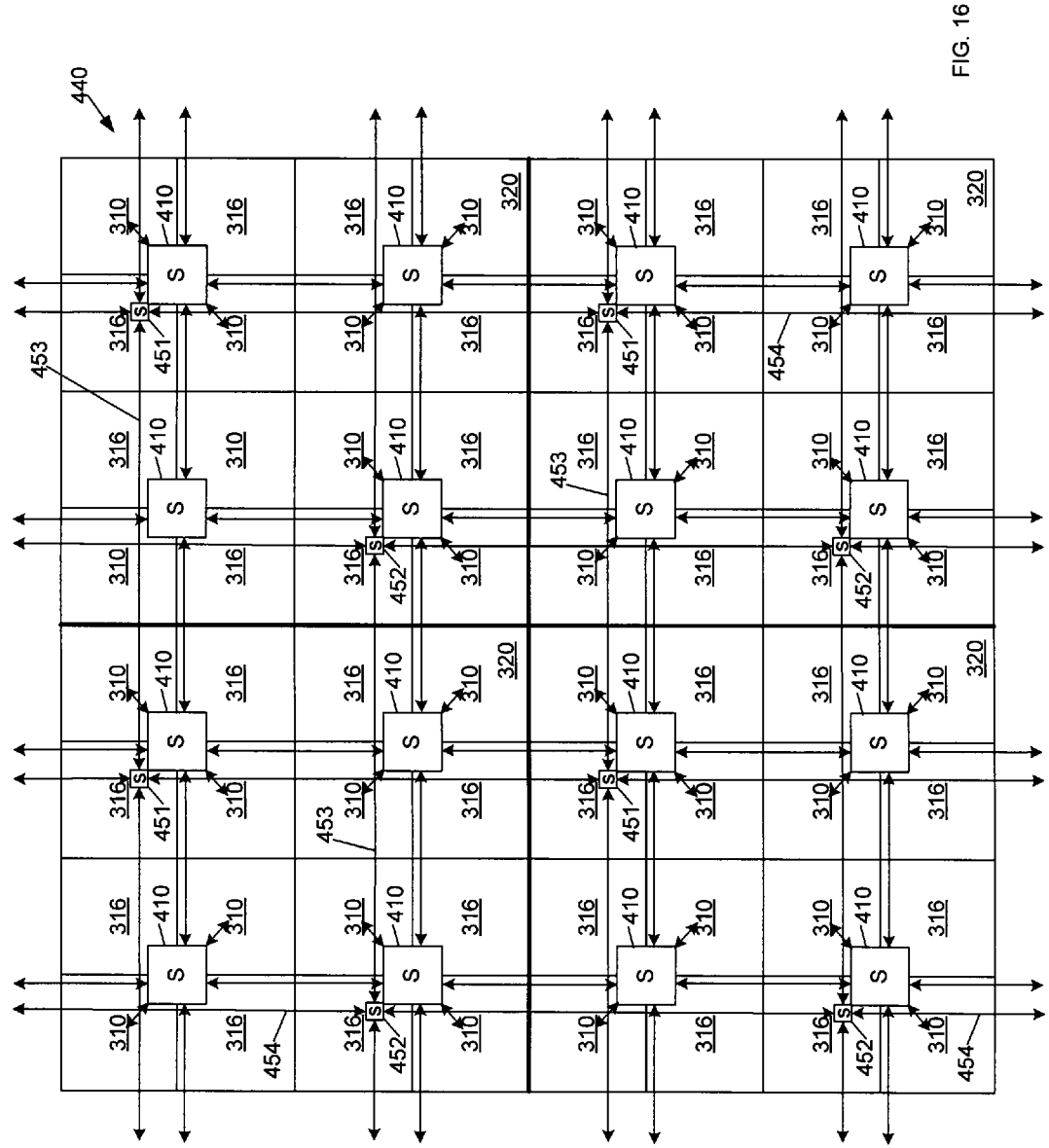
FIG. 16 is a block diagram of yet another communication system within an arrangement of components according to embodiments of the invention.

FIG. 16 illustrates four tiles 320 assembled in a 2×2 pattern as a portion of an integrated circuit 440. Within the integrated circuit 440 of FIG. 16 is a further communication system, which can also be formed of virtual channel communication systems.

The switch 410 in the upper right of each tile 320 is coupled to a switch 451 in a first long-distance network while the switch 410 in the lower left corner of each tile 320 is coupled to a switch 452 in a second long distance network. Switches 451, 452 can be constructed similar to the switches 410 although they may include different numbers of virtual channels. One example of a connection between the switches 410 and 451, 452 is illustrated in FIG. 15. In that figure, the communication lines 418 couple directly to the selectors 430 from one of the switches 451 or 452, depending on which is coupled to the switch 410. Switches 451 are coupled to one another through a communication network 453, while switches 452 are coupled to one another through a communication network 454. Either or both of the networks 453, 454 can be virtual channel networks.

Because of how switches 410 couple to switches 451, 452, each of the two long distance networks within the circuit 440 illustrated in FIG. 16 is separate. Note that none of the switches 451 directly connect to any of the switches 452. Instead, data can be routed from a switch 451 to a switch 452 by routing through the intermediate distance network switches 410.

In operation, processors 310 communicate to each other over any of the networks described above. For instance, if the processors 310 are directly connected by a local communication channel 314 (FIG. 12), which may include virtual channels, then the most direct connection is over such a channel. If instead the processors 310 are located some distance away from each other, or are otherwise not directly connected by a local communication channel 314, then communicating through the intermediate communication network illustrated in FIG. 13 may be the most efficient. In such a communication network, switches 410 are programmed to connect output from the sending processor 310 to input of a receiving processor 310. Data may travel over communication lines 414 and 416 in such a network. Finally, in those situations where a receiving processor 310 is a relatively far distance from the sending processor 310, the distance network of FIG. 16 may be used. In such a network, data from the sending processor 310 would first move through an intermediate switch 410 and further to one of the distance switches 451 or 452, depending on location of the switch 410. The data is routed to the distance switch 451 or 452 that is closest to the destination 310. From the distance switch, the data is transferred through another intermediate switch 410 to the destination processor 310. Any or all of the communication lines between these components may include conventional, programmable, and/or virtual channels as best fits the purpose.

Details of setting up the various switches for either packet switching or circuit switching and operation of the virtual channels that can be used to transfer data in any of the above examples is identical or similar to the methods and system described above. Further, although several levels of communication networks have been disclosed, with different effective distances, any number of communication networks and any distance of such networks may be implemented without deviating from the spirit of the invention.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system of virtual communication channels in an integrated circuit, comprising:
   at least a first and second data sending port;
   a data receiver coupled to a physical bus, the physical bus having a capacity less than a capacity to send data from the at least first and second data ports simultaneously;
   a virtual channel master structured to receive first protocol information describing data in the first and second data sending ports and second protocol information describing the data receiver, and structured to couple data from a selected one of the at least first and second data sending ports to the physical bus based on a combination of the first and second protocol information.

2. A system of virtual channel communication according to claim 1 in which the second protocol information comprises a signal of a present ability of the data receiver to receive information.

3. A system of virtual communication channels according to claim 1 in which the virtual channel master comprises:
   a channel selector coupled to the at least first and second data sending ports and to the data receiver, and structured generate an output; and
   a bus controller coupled to the output of the channel selector and structured to connect the selected data port to the physical bus based on the output of the channel selector.

4. A system of virtual communication channels according to claim 1, further comprising a first and second protocol generator.

5. A system of virtual communication channels according to claim 4 in which the virtual channel master is structured to couple new first protocol information to the physical bus.

6. A system of virtual communication channels according to claim 4 in which the virtual channel master is structured to send new second protocol information to the at least first and second data sending ports.

7. A system of virtual communication channels according to claim 1, further comprising at least two data receivers coupled to the physical bus.

8. A system of virtual communication channels according to claim 7 in which data from the physical bus is structured to be simultaneously delivered to the at least two data receivers.

9. A system of virtual communication channels according to claim 1 in which the at least first and second data sending ports are output ports of a single processing unit.

10. A system of virtual communication channels according to claim 1 in which the first protocol information comprises a signal indicating a validity of data in the at least first and second data sending ports.

11. A system of virtual communication channels according to claim 1 in which the physical bus has a parallel width equal to a number of bits of data in a single one of the at least first and second ports plus a number of bits of the first and second protocol information.

12. A system of virtual communication channels according to claim 1 in which a single one of the at least first and second data sending ports, separate from protocol information, stores 33 bits of data.

13. A system of virtual communication channels according to claim 1, further comprising a data storage stage within the physical bus.

14. A system of virtual communication channels in an integrated circuit, comprising:
   at least two data sending ports;
   a physical channel that has a capacity less than the at least two data sending ports;
   one or more receiving ports coupled to the physical channel; and
   a channel master coupled between the at least two data sending ports and the physical channel, the channel master including:
      a first protocol receiver to receive first information describing data presently stored in the at least two data sending ports,
      a second protocol receiver to receive second information describing a present ability of the one or more receiving ports to accept data,
      the channel master structured to couple data from a selected one of the at least two data sending ports to the physical channel based at least in part on a state of the first information and the second information.

15. A system of virtual communication channels according to claim 14 in which the channel master comprises:
   a channel selector coupled to the at least two data sending ports and structured to inspect the first and second information and to generate an output; and
   a channel controller coupled to the output of the channel selector and structured to couple the data from the selected data sending port to the physical channel based on the output of the channel selector.

16. A system of virtual communication channels according to claim 14 in which the channel master is structured to modify the first and second information.

17. A system of virtual communication channels according to claim 14 in which the first information comprises a signal indicating a validity of data in the at least two sending ports.

18. A system of virtual communication channels according to claim 14 in which the physical channel has a parallel data width equal to a width of data in a single one of the at least two data sending ports plus a width of first information about data in the at least two data sending ports and a width of second information about the one or more receiving ports.

19. An integrated circuit, comprising:
   a first plurality of processing units each having at least two output data ports;
   a second plurality of processing units each having at least one input data port;
   a virtual communication network having multiple sections, each section coupled between one of the first plurality of processing units and one of the second plurality of processing units, each section of the virtual communication network including:
      a physical bus having a bus width less than a width of the at least two output data ports; and
      a channel master coupled between the at least two output data ports and the physical bus and structured to couple data from exactly one of the output data ports to the physical bus based on a simultaneous combination of forward protocol information from the one of the first plurality of processing units and based on reverse protocol information from the one of the second plurality of processing units.

20. An integrated circuit according to claim 19, further comprising:
   a second virtual communication network coupled to the virtual communication network, the second virtual network including a plurality of data directing switches.

21. An integrated circuit according to claim 20 in which the second virtual communication network further comprises a system of physical channels coupled between the plurality of data directing switches, the system of physical channels including virtual channels.

22. An integrated circuit according to claim 21 in which at least some of the physical channels on the second virtual communication network include a different number of virtual channels than a number of channels in the virtual communication network.

23. An integrated circuit according to claim 20 in which at least one of the plurality of data directing switches are coupled to the virtual communication network.

24. An integrated circuit according to claim 20, further comprising a third virtual communication network coupled to the second virtual communication network.

25. A method for communicating data within an integrated circuit in a system that has at least two data sending ports, a physical communication channel coupled to the at least two data sending ports, and at least one data receiver coupled to the physical communication channel, the method comprising:
   inspecting first protocol information describing the data in the data sending ports;
   inspecting second protocol information describing a present ability of the at least one data receiver to receive data;
   selecting, based on the first and second protocol information, one of the at least two sending ports; and
   coupling data from the selected data port to the physical channel based on the selection.

26. A method according to claim 25 in which selecting one of the at least two data sending ports comprises:
   grouping those of the at least two data sending ports that are presently ready to send data; and
   choosing one of the data sending ports from the group as the selected data port.

27. A method according to claim 26 in which choosing one of the data sending ports comprises choosing one of the data sending ports based on a history of which data sending ports have been previously connected to the physical communication channel.

28. A method according to claim 26 in which choosing one of the data sending ports comprises choosing the data port amongst the group that was least recently used.

29. A method according to claim 25, further comprising sending the data from the selected data sending port and the first protocol information from each of the at least two data sending ports across the physical communication channel to a receiving port.

30. A method according to claim 25, further comprising sending the data from the selected data sending port across the physical communication channel to at least one of a plurality of receiving ports.

31. A method according to claim 25, further comprising:
   modifying the first protocol information of the non-selected data ports; and coupling the modified first protocol information to the physical channel.

32. A method of communicating between a first and a second element in an integrated circuit, comprising:
inspecting a first set of protocol data that indicates a present validity of data at each of two or more data ports;
inspecting a second set of protocol data that indicates an ability of one or more data receivers to receive data in a present communication cycle;
selecting, based on the first set of protocol data and the second set of protocol data one of the two or more data ports; and
connecting the selected data port to a physical communication bus having a parallel bandwidth less than a combined capacity of the two or more data ports.

33. A method according to claim 32, further comprising:
generating new first protocol information based on the selection; and
connecting the new first protocol information to the physical communication bus.

34. A method according to claim 32, further comprising:
programming a programmable switch in a communication network that includes the physical communication bus.

35. A method according to claim 34 in which programming a programmable switch comprises writing data to a memory element coupled to a multiplexer.

* * * * *